US012283059B2

(12) United States Patent
LeGaye et al.

(10) Patent No.: US 12,283,059 B2
(45) Date of Patent: *Apr. 22, 2025

(54) RESILIENT DYNAMIC PROJECTION MAPPING SYSTEM AND METHODS

(71) Applicant: NIKE, Inc., Beaverton, OR (US)

(72) Inventors: Robert G. LeGaye, Portland, OR (US); Ian Coyle, Portland, OR (US); Ian LeBlanc, Portland, OR (US); Ben Purdy, Portland, OR (US); Thomas Wester, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,579

(22) Filed: Oct. 6, 2023

(65) Prior Publication Data
US 2024/0037763 A1 Feb. 1, 2024

Related U.S. Application Data

(63) Continuation of application No. 17/590,984, filed on Feb. 2, 2022, now Pat. No. 11,816,848, which is a
(Continued)

(51) Int. Cl.
*G06T 1/00* (2006.01)
*G01B 11/25* (2006.01)
(Continued)

(52) U.S. Cl.
CPC .......... *G06T 7/251* (2017.01); *G01B 11/2504* (2013.01); *G06T 17/20* (2013.01); *G06T 2207/10028* (2013.01)

(58) Field of Classification Search
CPC ....... G06T 15/205; G06T 17/205; G06T 7/73; G06T 7/251; G06T 13/40; G06T 7/75; G06T 7/74; G06T 2207/30196; G06N 3/08
See application file for complete search history.

(56) References Cited

U.S. PATENT DOCUMENTS

2020/0160542 A1* 5/2020 Kanzawa ................ G06T 7/337
2020/0334895 A1 10/2020 Skotheim et al.

FOREIGN PATENT DOCUMENTS

| CN | 105283905 A | 1/2016 |
| CN | 106454291 A | 2/2017 |
| GB | 2569656 A | 6/2019 |

OTHER PUBLICATIONS

Zhou, Yi et al: "Pmomo" Human Factors in Computing Systems, ACM, 2 Penn plaza, Suite 701 New York NY 10121-0701 USA, May 7, 2016 (May 7, 2016), pp. 781-790, XP058257411, DOI: 10.1145/2858036.2858329, ISBN: 978-1-4503-3362-7, the whole document.
(Continued)

*Primary Examiner* — Phuoc H Doan
(74) *Attorney, Agent, or Firm* — Banner & Witcoff, Ltd.

(57) ABSTRACT

Systems and methods for dynamically tracking objects, and projecting rendered 3D content onto said objects in realtime. The methods described herein further include image data capture performed by various image-capturing devices, wherein said data is segmented into various components to identify one or more projectors for rendering and projecting 3D content components onto one or more objects.

20 Claims, 13 Drawing Sheets

Related U.S. Application Data continuation of application No. 16/727,545, filed on Dec. 26, 2019, now Pat. No. 11,270,443.

(60) Provisional application No. 62/784,960, filed on Dec. 26, 2018.

(51) Int. Cl.
*G06T 7/246* (2017.01)
*G06T 17/20* (2006.01)

(56) References Cited

OTHER PUBLICATIONS

Alexander, Berner et al: "Combining contour and shape primitives for ojbect detection and pose estimation of prefabricated parts", 2013 IEEE International Conference on Image Processing, IEEE, Sep. 15, 2013 (Sep. 15, 2013), pp. 3326-3330, XP032966291, DOI: 10.1109/ICIP.2013.6738685 [retrieved on Feb. 11, 2014] p. 3326-p. 3328.

Yao, Yuan et al: "Real-Time Hand Pose Estimation from RGB-D Sensor" Multimedia and Expo (ICME), 2012 IEEE International Conference on, IEEE, Jul. 9, 2012 (Jul. 9, 2012), pp. 705-710, XP032235763, DOI: 10.1109/ICME.2012.48, ISBN: 978-1-4673-1659-0, p. 706-p. 708.

YU-I, Yang et al: "Virtual try-on of footwear in augmented reality using RGB-D cameras", 2015 IEEE International Conference on Industrial Engineering and Engineering Management (IEEM), IEEE, Dec. 6, 2015 (Dec. 6, 2015), pp. 1072-1076, XP032853010, DOI: 10.1109/IEEM.2015.7385813 [retrieved on Jan. 18, 2016], p. 1072-p. 1074.

Grundhofer, A, et al: "Recent Advances in Projection Mapping Algorithms, Hardware and Applications", Computer Graphics Forum, vol. 37, No. 2, May 2018 (May 2018), pp. 653-675, XP55538690, GB, ISSN: 0167-7055, DOI: 10.1111\cgf.13387, section 4.4.

Mar. 18, 2018—(WO) ISR & WO—App. No. PCT/US19/068573.

\* cited by examiner

RESILIENT DYNAMIC PROJECTION MAPPING SYSTEM AND METHODS

The present application is a continuation of U.S. patent application Ser. No. 17/590,984 filed Feb. 2, 2022, which claims the benefit of and priority to U.S. patent application Ser. No. 16/727,545 filed Dec. 26, 2019, now U.S. Pat. No. 11,270,443 dated Mar. 8, 2022, which claims the benefit of and priority to U.S. Provisional Patent Application No. 62/784,960, entitled "RESILIENT DYNAMIC PROJECTION MAPPING SYSTEM AND METHODS" and filed Dec. 26, 2018, the contents of which are expressly incorporated by reference herein in their entirety for any and all non-limiting purposes.

BACKGROUND

Certain projection mapping systems are limited in terms of the type of physical objects that may be used to project content thereon, and further, the system's ability to accurately track physical objects and render content onto those objects in real-time. Indeed, previous projection systems, including those that use marker-based methods for tracking objects, require more processing needs, increased set-up time for pre-scanning objects (e.g., objects fixed with dot markers), and image capturing devices with high fidelity and/or frame rates to capture the marked objects. Performing such resource-intensive object tracking and content rendering limits the scalability of prior projection mapping systems and, further, limits the type and size of the objects that are tracked and rendered by such systems.

In order to efficiently track and render, in real-time, three-dimensional (3D) content onto various physical objects in as many scenarios and conditions with a lower amount of requisite processing resources, a specialized system and process is needed to minimize reliance on manually configuring and determining the pose and location of a physical object in 3D space. Thus, there is a need for an improved projection mapping system that is capable of efficiently obtaining image data associated with the object, and to perform detection and tracking techniques using such image data to project rendered content to the location of tracked physical objects. Accordingly, aspects of the present disclosure are directed toward solving this challenge by building a projection mapping system that does not require dot markers to locate the positioning of tracked objections and, further, that identifies one or more projectors that are optimal for rendering and projecting 3D content onto particular regions of the physical object, thereby optimizing the image quality of 3D content being rendered and projected onto each component of the physical object.

Therefore, improved systems and methods to address these and other shortcomings in the art are desired.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to improving systems and methods for dynamically tracking physical objects and projecting, in real-time, rendered 3D content onto said physical objects. Certain implementations may reduce the processing load on computing devices used to track physical objects and render 3D content thereon. In some embodiments, image data captured by various image-capturing devices may be segmented into various components such that the system may identify the best (e.g., optimal) projection devices for rendering and projecting each component of 3D content onto the physical object. Additionally, the projection system described herein performs contour detection of image data indicating the physical object, thereby enabling the system to track the position/angle of the physical object (in real-time) and, further, to filter out "false positives" in physical object detection by tracking detected contours for a specified time period to confirm their validity.

Example embodiments may relate to a system, method, apparatus, and computer readable media configured for tracking, rendering, and projecting 3D content onto physical objects. Image capturing devices may be used to collect image and depth data relating to a physical object, which is used by the system to determine the position and rotation angle of the physical object within a coordinate system/space. Further aspects relate to rendering 3D content to be projected onto various regions of the physical object. The system may select particular projection devices to project the 3D content onto the physical object based on the position and angle of each projector in relation to the various components of the 3D content which will be displayed on the physical object.

These and other aspects of the embodiments are discussed in greater detail throughout this disclosure, including the accompanying drawings.

DETAILED DESCRIPTION

Aspects of innovations disclosed herein further relate to systems and methods for dynamically tracking physical objects in a coordinate space and, further, rending and projecting content onto said objects using position and rotation angle information collected from image-capturing devices. Using improved processing, tracking, and rendering techniques, the projection mapping system described herein may selectively and dynamically identify the optimal projection devices for rendering and projecting content onto physical objects in real-time.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure. Further, headings within this disclosure should not be considered as limiting aspects of the disclosure and the example embodiments are not limited to the example headings.

I. Example User System

A. Illustrative Networks

Figure 1:
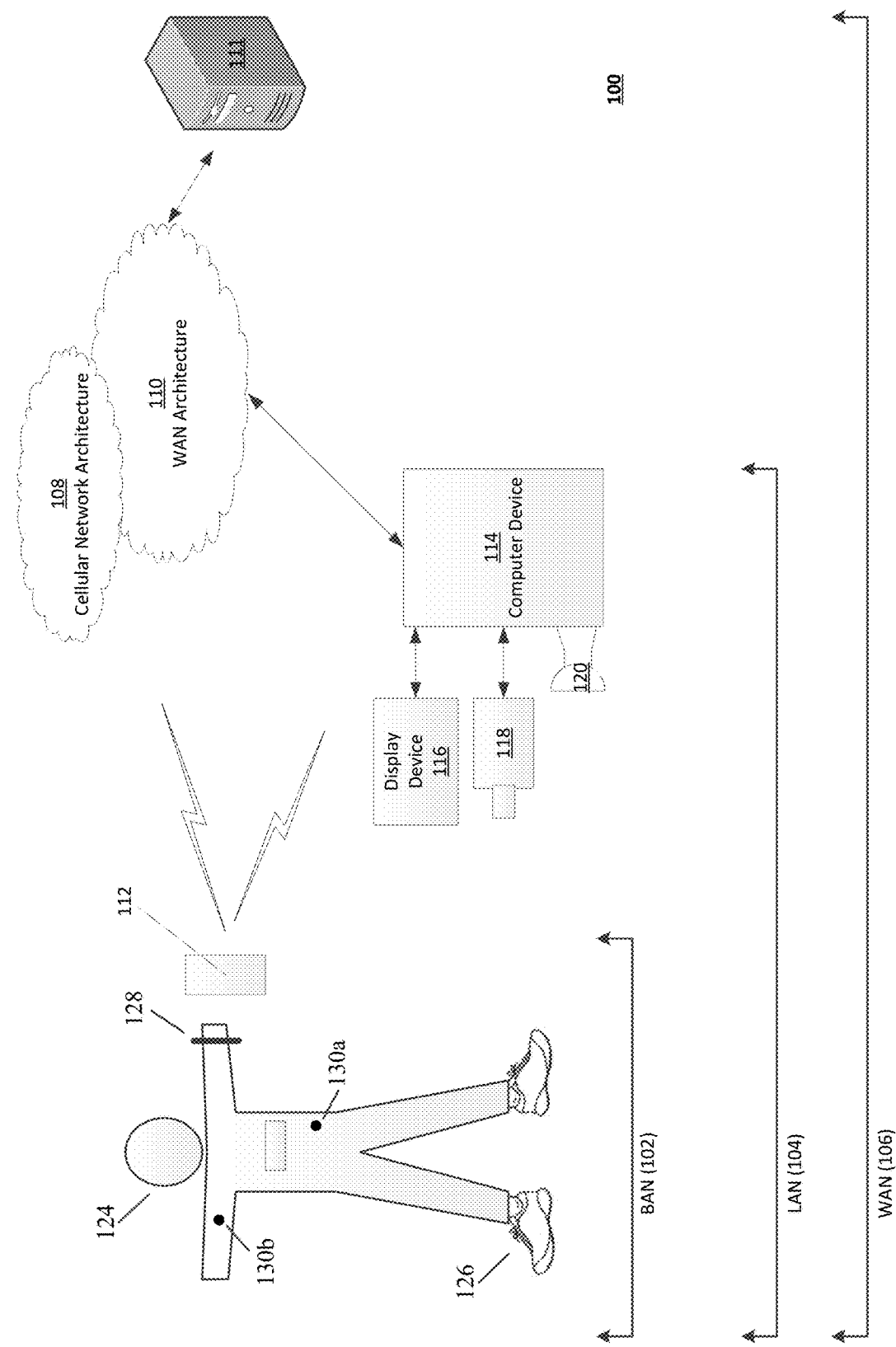
FIG. 1 illustrates an example system that may be configured to provide a user with the ability to capture and transmit image data in accordance with example embodiments.

Aspects of this disclosure relate to systems and methods that may be utilized across a plurality of networks. In this regard, certain embodiments may be configured to adapt to dynamic network environments. Further embodiments may be operable in differing discrete network environments. FIG. 1 illustrates an example of a user communication system 100 in accordance with example embodiments. Example system 100 may include one or more interconnected networks, such as the illustrative body area network (BAN) 102, local area network (LAN) 104, and wide area network (WAN) 106. As shown in FIG. 1 (and described throughout this disclosure), one or more networks (e.g., BAN 102, LAN 104, and/or WAN 106), may overlap or otherwise be inclusive of each other. Those skilled in the art will appreciate that the illustrative networks 102-106 are logical networks that may each comprise one or more different communication protocols and/or network architectures and yet may be configured to have gateways to each other or other networks. For example, each of BAN 102, LAN 104 and/or WAN 106 may be operatively connected to the same physical network architecture, such as cellular network architecture 108 and/or WAN architecture 110. For example, portable electronic device 112, which may be considered a component of both BAN 102 and LAN 104, may comprise a network adapter or network interface card (NIC) configured to translate data and control signals into and from network messages according to one or more communication protocols, such as the Transmission Control Protocol (TCP), the Internet Protocol (IP), and the User Datagram Protocol (UDP) through one or more of architectures 108 and/or 110. These protocols are well known in the art, and thus will not be discussed here in more detail.

Network architectures 108 and 110 may include one or more information distribution network(s), of any type(s) or topology(s), alone or in combination(s), such as for example, cable, fiber, satellite, telephone, cellular, wireless, etc. and as such, may be variously configured such as having one or more wired or wireless communication channels (including but not limited to: WiFi®, Bluetooth®, Near-Field Communication (NFC) and/or ANT technologies). Thus, any device within a network of FIG. 1, (such as portable electronic device 112 or any other device described herein) may be considered inclusive to one or more of the different logical networks 102-106. With the foregoing in mind, example components of an illustrative BAN and LAN (which may be coupled to WAN 106) will be described.

LAN 104 may include one or more electronic devices, such as for example, computer device 114. Computer device 114, or any other component of system 100, may comprise a mobile terminal, such as a telephone, music player, tablet, netbook or any portable device. In other embodiments, computer device 114 may comprise a media player or recorder, desktop computer, server(s), a gaming console, such as for example, a Microsoft® XBOX, Sony® Playstation, and/or a Nintendo® Wii gaming consoles. Those skilled in the art will appreciate that these are merely example devices for descriptive purposes and this disclosure is not limited to any console or computing device.

Those skilled in the art will appreciate that the design and structure of computer device 114 may vary depending on several factors, such as its intended purpose. One example implementation of computer device 114 is provided in FIG. 2, which illustrates a block diagram of computing device 200. Those skilled in the art will appreciate that the disclosure of FIG. 2 may be applicable to any device disclosed herein. Device 200 may include one or more processors, such as processor 202-1 and 202-2 (generally referred to herein as "processors 202" or "processor 202"). Processors 202 may communicate with each other or other components via an interconnection network or bus 204. Processor 202 may include one or more processing cores, such as cores 206-1 and 206-2 (referred to herein as "cores 206" or more generally as "core 206"), which may be implemented on a single integrated circuit (IC) chip.

Cores 206 may comprise a shared cache 208 and/or a private cache (e.g., caches 210-1 and 210-2, respectively). One or more caches 208/210 may locally cache data stored in a system memory, such as memory 212, for faster access by components of the processor 202. Memory 212 may be in communication with the processors 202 via a chipset 216. Cache 208 may be part of system memory 212 in certain embodiments. Memory 212 may include, but is not limited to, random access memory (RAM), read only memory (ROM), and include one or more of solid-state memory, optical or magnetic storage, and/or any other medium that can be used to store electronic information. Yet other embodiments may omit system memory 212.

System 200 may include one or more I/O devices (e.g., I/O devices 214-1 through 214-3, each generally referred to as I/O device 214). I/O data from one or more I/O devices 214 may be stored at one or more caches 208, 210 and/or system memory 212. Each of I/O devices 214 may be permanently or temporarily configured to be in operative communication with a component of system 100 using any physical or wireless communication protocol.

Returning to FIG. 1, four example I/O devices (shown as elements 116-122) are shown as being in communication with computer device 114. Those skilled in the art will appreciate that one or more of devices 116-122 may be stand-alone devices or may be associated with another device besides computer device 114. For example, one or more I/O devices may be associated with or interact with a component of BAN 102 and/or WAN 106. I/O devices 116-122 may include, but are not limited to activity data acquisition units, such as for example, sensors. One or more I/O devices may be configured to sense, detect, and/or measure an athletic parameter from a user, such as user 124. Examples include, but are not limited to: an accelerometer, a gyroscope, a location-determining device (e.g., GPS), light (including non-visible light) sensor, temperature sensor (including ambient temperature and/or body temperature), sleep pattern sensors, heart rate monitor, image-capturing sensor, moisture sensor, force sensor, compass, angular rate sensor, and/or combinations thereof among others.

In further embodiments, I/O devices 116-122 may be used to provide an output (e.g., audible, visual, or tactile cue)

and/or receive an input, such as a user input from user 124. Example uses for these illustrative I/O devices are provided below, however, those skilled in the art will appreciate that such discussions are merely descriptive of some of the many options within the scope of this disclosure. Further, reference to any data acquisition unit, I/O device, or sensor is to be interpreted disclosing an embodiment that may have one or more I/O device, data acquisition unit, and/or sensor disclosed herein or known in the art (either individually or in combination).

System 100 may be configured to transmit and/or receive data, including image data captured by an image-capturing device within portable device 112 (and/or a stand-alone image-capturing device 118, such as a camera) collected within system 100 or otherwise provided to system 100. As one example, WAN 106 may comprise server 111. Server 111 may have one or more components of system 200 of FIG. 2. In one embodiment, server 111 comprises at least a processor and a memory, such as processor 206 and memory 212. Server 111 may be configured to store computer-executable instructions on a non-transitory computer-readable medium. The instructions may comprise image data, such as raw or processed data collected within system 100. System 100 may be configured to transmit data, such as images and/or video, to a social networking website or host such a site. Server 111 may be utilized to permit one or more users to access image data obtained by one or more users. As such, server 111 may be configured to transmit and/or receive notifications based upon image data or other information.

Returning to LAN 104, computer device 114 is shown in operative communication with a display device 116, an image-capturing device 118, sensor 120, which are discussed in turn below with reference to example embodiments. In one embodiment, display device 116 may provide audio-visual cues to user 124 to capture images of a particular object. The audio-visual cues may be provided in response to computer-executable instruction executed on computer device 114 or any other device, including a device of BAN 102 and/or WAN. Display device 116 may be a touchscreen device or otherwise configured to receive a user-input.

Image data and/or depth data may be obtained from image-capturing device 118 (and/or portable device 112), which may be used to detect items within the image data (and/or to train the system to detect items within image data). Image-capturing device 118 may comprise a transceiver device. In one embodiment image-capturing device 118, may transmit waveforms into the environment, including towards the direction of user 124 and receive a "reflection" or otherwise detect alterations of those released waveforms. Those skilled in the art will readily appreciate that signals corresponding to a multitude of different data spectrums may be utilized in accordance with various embodiments. In this regard, devices 118 may detect waveforms emitted from external sources (e.g., not system 100). For example, devices 118 may detect heat being emitted from user 124 and/or the surrounding environment. Thus, image-capturing device 126 may comprise one or more thermal imaging devices. In one embodiment, image-capturing device 126 may comprise an IR device configured to perform range phenomenology. In still other embodiments, the image-capturing device may comprise a depth sensor camera.

BAN 102 may include two or more devices configured to receive, transmit, or otherwise facilitate the collection of image data (including passive devices). Exemplary devices may include one or more data acquisition units, or devices known in the art or disclosed herein, including but not limited to I/O devices 116-122. Two or more components of BAN 102 may communicate directly, yet in other embodiments, communication may be conducted via a third device, which may be part of BAN 102, LAN 104, and/or WAN 106. One or more components of LAN 104 or WAN 106 may form part of BAN 102. In certain implementations, whether a device, such as portable device 112, is part of BAN 102, LAN 104, and/or WAN 106, may depend on the user's proximity to an access point to permit communication with mobile cellular network architecture 108 and/or WAN architecture 110. User activity and/or preference may also influence whether one or more components are utilized as part of BAN 102. Example embodiments are provided below.

User 124 may be associated with (e.g., possess, carry, wear, and/or interact with) any number of devices, such as portable device 112, shoe-mounted device 126, wrist-worn device 128. One or more devices 112, 126, 128, may be specially designed for image-capturing purposes. Indeed, data from one or more devices may be utilized to collect and detect image data, and in some instances athletic data. In certain embodiments, one or more devices of BAN 102 (or any other network) may comprise an image-capturing device that is specifically designed for a capturing particular types of image data.

Looking to the illustrative portable device 112, it may be a multi-purpose electronic device, that for example, includes a telephone or digital music player, including an IPOD®, IPAD®, or iPhone®, brand devices available from Apple, Inc. of Cupertino, California or Zune® or Microsoft® Windows devices available from Microsoft of Redmond, Washington. As known in the art, digital media players can serve as an output device, input device, and/or storage device for a computer. Device 112 may be configured as an input device for receiving raw or processed data collected from one or more devices in BAN 102, LAN 104, or WAN 106. In one or more embodiments, portable device 112 may comprise one or more components of computer device 114. For example, portable device 112 may be include a display 116, image-capturing device 118, and/or one or more data acquisition devices, such as any of the I/O devices 116-122 discussed above, with or without additional components, so as to comprise a mobile terminal.

In certain embodiments, I/O devices may be formed within or otherwise associated with user's 124 clothing or accessories, including a watch, armband, wristband, necklace, shirt, shoe, or the like. These devices may be configured to capture image data. It is to be understood that they may detect image data based on one or more athletic movements during user's 124 interactions with computer device 114 and/or operate independently of computer device 114 (or any other device disclosed herein). For example, one or more devices in BAN 102 may be configured to function as an all-day activity monitor that measures activity regardless of the user's proximity or interactions with computer device 114. In certain embodiments, device 126 shown in FIG. 1, may comprise footwear which may include one or more sensors, including but not limited to those disclosed herein and/or known in the art.

Element 130 of FIG. 1 shows an example sensory location which may be associated with a physical apparatus, such as a sensor, data acquisition unit, or other device. Yet in other embodiments, it may be a specific location of a body portion, region, or worn product that is monitored, such as via an image-capturing device (e.g., image-capturing device 118). In certain embodiments, element 130 may comprise a sensor, such that elements 130a and 130b may be sensors integrated into apparel, such as athletic clothing. Such sensors may be placed at any desired location of the body of user 124. Sensors 130a/b may communicate (e.g., wirelessly) with one or more devices (including other sensors) of BAN 102, LAN 104, and/or WAN 106.

II. General Description of Dynamic Projection Mapping System According to Examples of Present Disclosure In general, as described above, some aspects of this invention relate to systems and methods for performing contour detection on image data (e.g., data indicating two-dimensional (2D) images, depth information, etc.) from multiple point clouds, including three-dimensional (3D) point clouds, and dynamically projecting 3D content to a location and a rotation angle of a tracked object, including, but not limited to, consumer products such as footwear, apparel, athletic equipment, and the like.

Various types of objects may be tracked by the projection mapping system described herein, including any desired type of consumer product, using a variety of different sensors and/or image-capturing devices. For example, the system may utilize one or more image-capturing devices, such as a depth sensor camera to capture images and depth data of a physical object, to determine spatial coordinates or a location of the physical object and, further, to determine a rotation angle of the physical object as detected by the one or more image-capturing devices. The spatial coordinates and rotation angle may be determined with respect to any suitable frame of reference, for example a coordinate space of the imaging device or a tracking space in which the physical object is to be tracked. The system may utilize the one or more image-capturing devices, which may be positioned near and/or around the physical object, to capture one or various images, video, and/or depth information (i.e., image data) of the object from a plurality of different locations and/or viewing angles. Using the captured image data obtained via the image-capturing devices, the system may also performs contour detection and tracking of the physical object, for example, the system may detect one or more boundaries of the physical object using the captured image data.

The system accomplishes such contour detection by processing the image data captured by the one or more image-capturing devices to identify one or more contours of the physical object and, further, the system tracks the position and/or rotation angle of the one or more contours. For example, the system may track the position and/or rotation angle of the one or more contours with respect to specified regions of the physical object. The contours may comprise lines (such as linear or curvilinear lines), for example lines representing a boundary of a surface region of the object. The contours may comprise shapes, for example two dimensional shapes of a surface region of the object, which may be two dimensional or three dimensional shapes of a surface region of the object. For example, when the tracked physical object is footwear, the system may track position and angle information within a foot region of the footwear (e.g., ground level), an outsole region of the footwear, a midsole region of the footwear, a toe cap region of the footwear, and/or an "ankle" region of the footwear (e.g., a specified number of inches above the ground level). The ankle region may be located at a specified number of inches above the "foot region," e.g., 3, 4, 6, or 7 inches above the set foot region. A user or system administrator may designate the location and/or regions attributed to the foot and ankle regions. As another example, the system may track position and angle information within an "upper" region of the footwear (e.g., the portion of the footwear comprising the footwear upper). Additionally, the system may perform edge detection to find one or more boundaries of the tracked physical object within the image data obtained from one or more image-capturing devices. When performing such edge detection, the system identifies data points in the image data, obtained from the one or more image-capturing devices, at which a level of brightness of the image changes suddenly or has discontinuities. For example, the system may compare a change (e.g., delta) in brightness and/or image contrast for one or more data points in the image data to a threshold value. Additionally or alternatively, the system may compare a measured level of brightness and/or image contrast for one or more data points in the image data to a threshold value or range of threshold values. Thus, the data points at which the system determines that the image brightness changes suddenly (e.g., the one or more data points in the image data satisfies one or more determined threshold values) is typically organized by the system into a set of curved line segments or "edges."

The system may utilize captured image data indicating a tracked physical object as well as contour detection information to render a 3D model of the physical object. The system may store the rendered 3D model of the object in a database (or other suitable storage) for subsequent use by the system. The rendered 3D model may be stored to a storage location within the system and/or to an external storage location. The system may determine one or more components (e.g., regions of interests) of the rendered 3D model of the object, and store this information along with the 3D model, in a separate database, server or other suitable storage. Such components may comprise contours to be detected so that position and/or angle information relating to the contours of a specified component can be determined. Thus, the component and contour information associated with the 3D model may be stored along with the 3D model in the database (e.g., a relational database associating the component and contour information with respective 3D models). The position and/or rotation angle information for each contour associated with the 3D model may also be stored in the database. For each of the one or more contours associated with the 3D model, the system may use the database to determine position and/or rotation angle information for said contour. Additionally or alternatively, the system may use point cloud information associated with the 3D model to determine position and/or rotation angle information for said contour(s). Additionally, the system may utilize the rendered 3D model of the physical object to project, via one or more image-projection devices (e.g., projectors), the 3D model onto a location in a tracking space containing the physical object. For instance, in an example where the tracked physical object is footwear, the system may utilize one or more projectors to project, onto the footwear, one or more different components of a rendered 3D model of the footwear. In this example, the system may determine a particular projector (or projectors) to project a particular component (or components) of the rendered 3D model based on the location and rotation angle of the physical object and of the component(s) of the 3D model, and the angle at which a projectors is (or projectors are) projecting images of the rendered 3D model onto the physical object. For instance the system may determine one or more projectors having the most favorable (e.g., optimal) projection angle(s) for projecting images of the 3D model onto the tracked object. In other words, the system may determine, for each component of the rendered 3D model, which projector is positioned in a manner that best faces and, thus, optimally projects the 3D model component onto the physical object. As explained above, the system may determine one or more projectors to project one or more components of the rendered 3D model based on the location of the physical object and of the component(s) of the 3D model. In some instances, the system may utilize a current location of the physical object and components of the 3D model to determine the one or more objections.

The system may project various content, such as images, photographs, video, etc., onto various portions/segments of the physical object. Additionally, the system may display content on various portions of the object (e.g., footwear), such as: projecting a color on a portion of the article of footwear (e.g., the various upper portions or elements, the various midsole portions or elements, the various outsole portions or elements, etc.); projecting pictorial or other graphical data on the footwear, projecting logo data on the shoe (e.g., the footwear manufacturer's logo, a team or group logo, etc.); projecting textual data on the shoe, etc. While described above in conjunction with the projection of 3D content on footwear, systems in accordance with the present disclosure also may be used to project content of various other types of objects and consumer products, such as articles of apparel, athletic equipment, etc. The content may not include contours of the footwear that are detected in order to determine the position and/or angle information of the respective contours and thereby of the footwear.

In the footwear example described above, the projection mapping system may comprise a plurality of image-capturing devices to capture image data associated with a physical object from a plurality of different locations and/or a plurality of different viewing angles. For example, the system may capture one or more images of footwear from a plurality of different positions encircling the physical object. The image data indicating the footwear may be stored in a variety of locations, including a storage of the image-capturing device, or a storage of one or more computing devices residing within (or external to) the projection mapping system. In some instances, a system administrator (or other user) may view the captured image data using a user interface provided via one or more software applications for dynamically tracking and rendering 3D content onto a physical object. Such software application(s) may be executed on a user device, one or more computing devices within the projection mapping system, one or more computing devices external to the projection mapping system, or some combination thereof.

In some instances, users (e.g., a system administrator) may use one or more computing devices within (and/or external to) the projection system to access the tracking software application (e.g., tracking engine) and/or the rendering software application (e.g., rendering engine). These one or more computing devices may establish a communication channel within a network and communicate with a server system (comprising one or more server computers) that provides data processing for tracking a physical object and/or rendering a 3D model onto the physical object. Any desired communication link and communication protocol may be used to provide and control the data exchange between computing devices and the system. System administrators (or other users) may use a computing device to connect to the projection mapping system via a network, such as the Internet, a local area network (LAN), a wide area network (WAN), or other networks as described above in relation to FIG. 1. Users may connect their computing devices to the system via a suitable communication channel, such as website portals and applications from various social networking websites that link to the website portal of the manufacturer and/or system administrator.

Various types of computing devices may be used to exchange data with the projection mapping system without departing from aspects of the present disclosure, such as computing devices capable of establishing a networked connection and/or a peer-to-peer connection and capable of providing the necessary display, user interface, and input capabilities, as will be described in more detail below. Some more specific examples of computing devices that may be used in systems and methods in accordance with at least some examples of this invention include, but are not limited to: desktop computers, personal computers, laptop computers, palmtop computers, handheld computers, cellular telephones, any other mobile devices or smartphones, personal digital assistants, computer workstations, televisions, and the like.

Computing devices that may be used in systems and methods in accordance with examples of this invention may include one or more input devices and a data processing system (e.g., including one or more microprocessors). Examples of input devices that may be included with the computing devices may include one or more devices illustrated in FIGS. 1 and 2, and are not limited to conventional input devices, such as: a keyboard (hard keyboard or soft keyboard); a mouse, trackball, rollerball, touchpad, or other pointing device; a stylus or other pen-type input device (e.g., for a tablet PC type computing device); a disk drive; a USB port; a network connection; a joystick type controller; a telephone connection; an Ethernet connection; voice recognition capabilities; etc. Also, the computing devices may have "touch screen" capabilities, such that a user input data into the computing device by physically touching the screen of the display with the user's fingers or a selection device, such as a stylus. Additionally, any desired type of display device may be provided for use in conjunction with the computing devices of systems and methods according to this invention, including display devices integrated with the computing device itself or display devices separate from the computing devices but in communication therewith, such as projector displays, separate monitor displays, etc.

The software for generating the user interface discussed above may reside on computer readable media present on or available to the computing device or server system. The user interface on may be provided and controlled by the user's computing device and/or by the server system, and data for generating, maintaining, and receiving input through the user interfaces may be generated and provided via computer readable media included as part of or associated with the computing device and/or the server system. Examples of such computer readable media include, but are not limited to: computer-readable memories, both internal to a computer (e.g., hard drives) or separable from the computer (such as disks, solid state or flash memory devices, data available over a networked connection, etc.), including any type of computer readable media that is conventionally known and used in the computer arts. Additionally or alternatively, if desired, the software, or at least some portion(s) thereof, may reside on more than one computing device or server system, which are, either wholly or partially, located within or external to the projection mapping system. The sever system may be operated and maintained by the same organization(s) or individual(s) that operate and maintain the computing device and/or network, or the server system may be operated, controlled, and maintained by a party separate from any or all of these entities. As some more specific examples, the server system may be operated and maintained (and the user interface software also may be operated and maintained) by one or more entities whose products are being classified through the classification systems and methods described below (e.g., a manufacturer, a retailer, a vendor selected by a manufacturer or retailer, etc.).

Image data may be captured from one or more image-capturing devices, such as a camera located on a mobile terminal device, a video camera, a still-image camera, a depth sensor camera, some combination thereof, and/or any apparatus configurable to detect wavelengths of energy, including light, magnetic fields, and/or thermal energy. The image-capturing device may comprise one or more of a camera (e.g., video camera, depth sensor camera), a projector, and one or more processors, i.e., a CPP unit. As used herein, "image data" may encompass raw and/or compressed data, either in a physical tangible form or stored on a computer-readable medium as electronic information. Further, a plurality of images may form part of a video and/or depth sensor information. Thus, references to image data, images and/or pictures encompass videos, depth sensor information, and the like.

Image data may be captured by one or more image-capturing devices (e.g., CPP units) while the user is within a retail environment. For example, a computer-readable medium may comprise computer-executable instructions that, when executed, may perform obtaining a plurality of images/video of footwear or other products) worn by a customer in a retail store. For example, portable electronic device 112 may comprise an application that permits user 124 (or another user(s), such as a system administrator) to use one or more image-capturing devices (either part of the portable electronic device and/or external image-capturing devices), to capture image data relating to one or more physical objects.

Upon the user (e.g., system administrator) activating an image capturing function (which may be a hard or soft button) using software application(s) (e.g., tracking and rendering engines), one or more computing devices within the system (e.g., computing device 114/314), external to the system, or some combination thereof, may process the captured image data to track the one or more physical objects and/or to render a 3D model of the object(s) and, further, to project that 3D model onto the physical object(s). Additionally, or alternatively, one or more steps of this data processing may be performed by one or more processors in one or more of the image-capturing devices (e.g., CPP units). Otherwise, the user may select the captured image data via a software application used to perform the tracking of the physical object and/or the rendering/projecting of the 3D model. Image data may be captured/determined wholly, or in-part, based on image data obtained by the image-capturing devices, such as depth sensor data.

Figure 3:
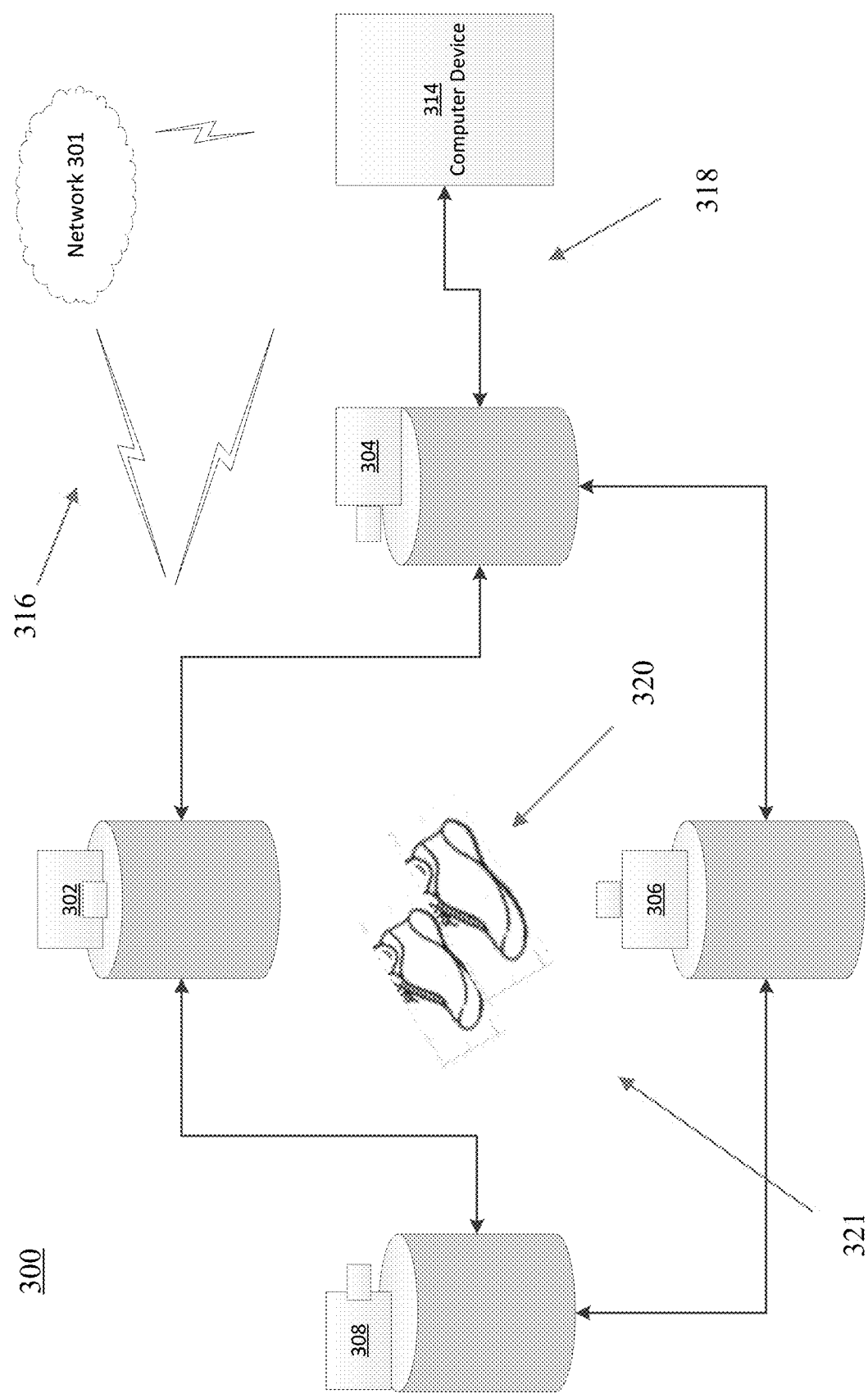
FIG. 3 shows a system environment for tracking and capturing images of objects in accordance with example embodiments.

As discussed above, one or more image-capturing devices, such as CPP units, may be used by the system to capture images of one or more physical objects within a tracking space. For example, as shown in FIG. 3, the projection mapping system 300 may comprise a plurality of CPP units (e.g., CPP units 302, 304, 30, 308) for capturing images of one or more physical objects, e.g., footwear 320, within a tracking space (e.g., tracking space 321), which is surrounded by the CPP units. As shown in FIG. 3, one or more of the CPP units may be operably connected to and/or in communication with other CPP units. A variety of communications methods may be implemented within the system enabling a CPP unit to communicate with one or more other CPP units. For example, the CPP units may be configured to communicate via one or more wired or wireless communication channels (including but not limited to: WiFi®, Bluetooth®, Near-Field Communication (NFC) and/or ANT technologies). Additionally, although FIG. 3 illustrates four CPP units, the system 300 may comprise fewer or additional CPP units for capturing image data, such as video or depth sensor data indicating the footwear 320. The number of CPP units for capturing images of the one or more physical objects (e.g., footwear 320) may be determined by the system administrator. One or more of the CPP units may transmit information (e.g., image data) to one or more computing devices within the projection system (e.g., computing device 314), or to other CPP units, using a wired or wireless connection. For example, as shown by element 318 in FIG. 3, CPP unit 304 may have a direct communication channel with computing device 314, for example, via a wired or wireless connection with computing device 314. Although not shown in FIG. 3, one or more other CPP units may be operatively in communication with computing device 314 (or other computing devices within the projection system) via a wired connection. Additionally, or alternatively, one or more CPP units may be operatively in communication with computing device 314 (or other computing devices—not shown in FIG. 3) via a wireless connection, for example, via network 301. Network 301 may comprise and/or have the same functionality as the one or more illustrative networks described above in FIG. 1 (e.g., illustrative networks 102-106).

As noted above, the projection mapping system may utilize the data processing capabilities of one or more CPP units to process image data captured by the CPP units. By performing some pre-processing functions locally at one or more of the CPP units, the system is enabled to provide increased scalability for processing large quantities of data, rather than having such processing functions performed at a location external to the CPP units or other devices outside the projection mapping system. Additionally, performing such pre-processing functions locally enables the system to reduce network load and latency resulting from the transfer and external processing of image data captured by the CPP units. Additionally, by performing some pre-processing functions locally at the CPP unit, data filtering performed by the system (e.g., filtering out "false positives" associated with physical object detection by tracking detected contours for a specified time periods to confirm their respective validity) is performed closer to the sensing of and image capturing performed by the system and CPP units. As discussed in more detail below, the system may calibrate individual coordinate spaces associated with and captured by the respective CPP units during one or more time periods, based on data obtained from multiple depth sensor cameras (e.g., CPP units), into one consistent space using a tracked physical object/model as reference. To perform such calibration, the system may output for display on a display device, via the tracking engine, a matching virtual 3D model of the tracked physical object to aid the user (e.g., system administrator) in manually and/or visually aligning one or more point clouds (e.g., a plurality/collection of data points defined by a coordinate space) generated from image data obtained by one or more CPP units. The point cloud(s) may be defined by various coordinate systems/spaces, for example, a 3D Cartesian coordinate system. As noted above, one or more point clouds may be generated by the system using data obtained from one or more CPP units and the image/depth data collected by the CPP units. For instance, after capturing images of footwear 320 using one or more CPP units at varying locations and from varying angles, the system (e.g., CPP units and/or computing device 314) may generate and/or store several data points returned from (and that cover) the surface(s) of the footwear 320.

III. General Description of Tracking and Rendering Performed by Dynamic Projection Mapping System According to Examples of Present Disclosure As discussed above, the projection mapping system may use one or more image-capturing devices (e.g., CPP units) to obtain image data (for example, depth sensor data) corresponding to one or more tracked physical object, such as footwear. One or more of the CPP units may be configured by the user (e.g., system administrator) to obtain image data at a specified frame rate. For example, one or more CPP units may be configured to obtain image data at 30 frames per second ("fps"). The CPP units may be configured to capture image data at other frame rates by the user (e.g., system administrator), such as capturing image data at 20 fps, 25 fps, 30 fps, or 35 fps. As shown in FIG. 3, multiple image-capturing devices may obtain image data relating to a tracked object(s), such as footwear 320. Each of the one or more image-capturing devices may be used by the system to capture image data relating to the object (e.g. footwear 320) from various different locations, heights, angles, etc. The image data obtained by the CPP units is sent to one or more computing devices (e.g., computing device 314), for example, via network 301, to be used for tracking and/or rendering 3D content onto one or more objects (e.g., footwear 320).

Figure 4A:
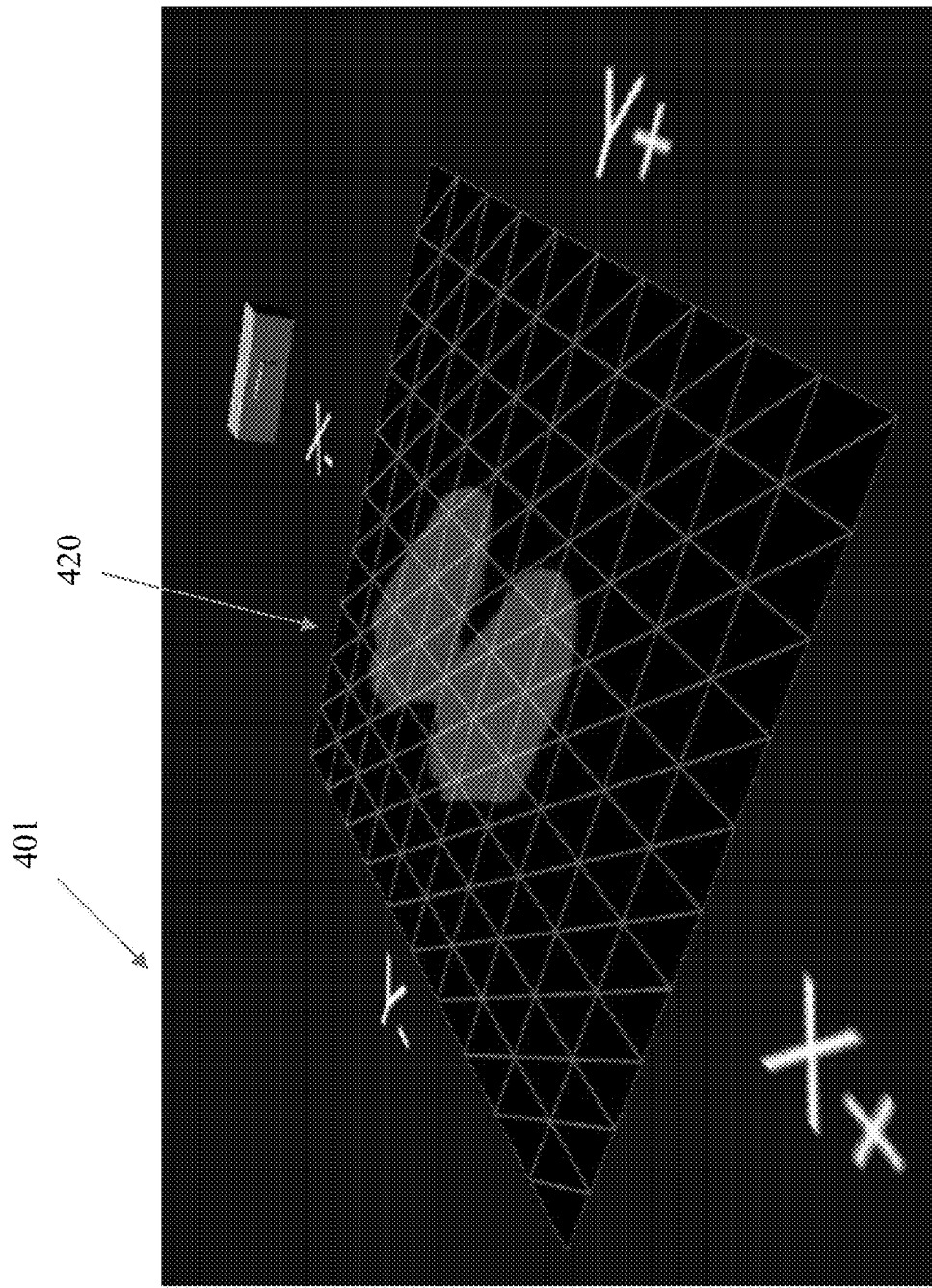
FIGS. 4A-4B shows examples of image data indicating objects and performance of contour detection in accordance with example embodiments.

As discussed above, the captured image data may be processed, either wholly or partially, by the one or more CPP units and/or one or more computing devices (e.g., computing device 314), to generate one or more point clouds of the tracked physical object(s). For the avoidance of doubt, a point cloud comprises a plurality of points defined in a spatial frame of reference and corresponding to locations on the surface of the object. As noted above, the software application executed on one or more computing devices used by the system to track the physical object(s), and as discussed in more detail below, to determine valid position and angle information for the tracked object(s), is referred to herein as a "tracking engine." As an example, FIG. 4A illustrates a rendering 401 of a point cloud generated using image data captured by the one or more CPP units depicted in FIG. 3. As shown in FIG. 4A, the combined image data from one or more CPP units may be used by the system to generate a single point cloud of the tracked object(s) (e.g., element 420) in a coordinate space (e.g., X/Y coordinate space), such as a Cartesian coordinate system for the tracking space. In some instances the system may generate one or more point clouds of the tracked object. The system may continuously capture image data using the CPP units over a set time period (e.g., 10 seconds, 15 seconds, 30 seconds, etc.) to generate a plurality of point clouds relating to the tracked object(s). The user (e.g., system administrator) may establish a time period in which image data indicating the physical object(s) is collected. The generated point cloud(s) of the tracked object(s) may be displayed in an exemplary coordinate space via a user interface, as illustrated by element 401 in FIG. 4A.

Figure 4B:
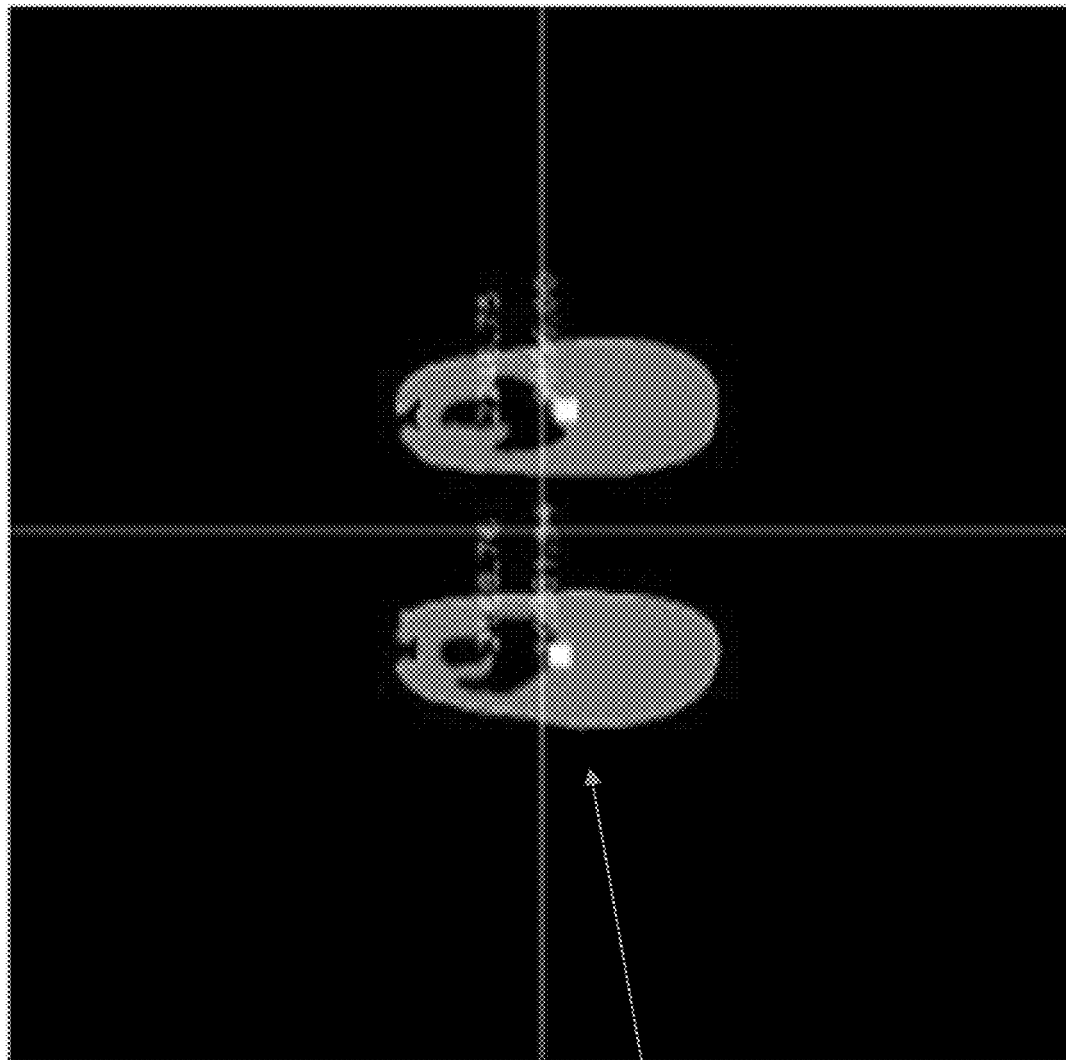

The projection system may combine one or more point clouds of the plurality of generated points, and the combined point clouds are rendered by the system from a set perspective to create an image of the tracking space. For example, the system may render the combined point clouds using a specified perspective to create a 2D image of the tracking space and/or physical object(s). Various perspectives may be specified by the user or system administrator, including a top-down perspective, a bottom-up perspective, a left-right perspective, and the like. In the example of a 2D, top-down image, the system processes the image data using predetermined vision techniques, such as the OpenCV library, to identify and locate contours (e.g., groupings of pixels) within the image data and, further, to determine the X/Y coordinate position as well as the rotation angle about a vertical axis (e.g., Z axis) for the one or more identified contours. For example, the system may perform contour detection on one or more point clouds generated for the tracked object(s) 420 shown in FIG. 4A and, as a result, may determine the position and/or rotation angle of one or more contours detected by the system for the tracked physical object(s), as shown in FIG. 4B. Additionally or alternatively, rather than tracking the one or more objects via rotation about a vertical axis, the system may be configured to track one or more physical objects moving in three-dimensions, for example, the user moving or rotating the physical object within the tracking space. The detected contours of the one or more generated point clouds along with corresponding position and rotation angle information may be displayed by the system, via the user interface, as illustrated by element 411 in FIG. 4B.

The system may track the position and/or rotation angle of one or more contours over a specified time period. For example, the system may track the position and/or angle of a contour for a tenth of one second, a quarter of one second, half of one second, or for other suitable periods of time. The system administrator or user may establish the time period for tracking one or more contours. The system may be configured to track the position and/or angle of a contour over a time period such that the validity of the detected contour can be determined by the system. For example, the system may track the position and/or angle of the contour over a time period such that the contour is considered to be valid by the system since it has existed within the captured image data for a predetermined period of time (e.g., a quarter of one second). This predetermined time period used by the system to establish contour validity may be set by the user (e.g., system administrator). By tracking a contour (or a plurality of contours) for a specified period of time to determine its validity, the system is thereby enabled to filter out "false positives," which may be caused by three-dimensional noise that might otherwise be interpreted as a valid object (or contour thereof) for one or more image frames before disappearing. It may also exclude contours detected while an object is moving within the tracking space, and this may improve accuracy of the tracking system by avoiding contour detection while the object is moving at such a velocity that the image-based tracking system cannot accurately capture image data of the object corresponding to a single position and orientation of the object within the respective tracking space.

The system may transmit the position and angle information for the one or more valid, tracked object(s) to the rendering engine for processing. The position and angle information for valid tracked object(s) may be continuously transmitted to the rendering engine. For example, the system may transmit, to the rendering engine, valid X/Y position data and rotation angle data for the one or more tracked objects. In some examples, as noted above, the rendering engine may be executed wholly, or in-part, by one or more computing devices within projection mapping system, and/ or one or more computing devices external to the projection mapping system. In examples where the rendering engine is executed on one or more remote computing devices, the system may transmit the determined position and angle information to the externally executed rendering engine for further data processing.

The system may utilize a virtual 3D model (e.g., virtual design), stored in one or more computing devices (e.g., computing device 314) or other suitable storage, to project a rendering of the 3D model at the location(s) and/or angle(s) of the one or more tracked physical objects, as determined by the tracking engine. The projection mapping system (or one or more computing devices external to the projection mapping system) may generate the virtual 3D model of the object(s) by taking 3D scans of one or more sizes of the physical object(s). For instance, the system may create a virtual 3D model of footwear by taking 3D scans of one or more sizes of a particular footwear/shoe model.

The system may use a specially-programmed computing device, such as a rotating scanner, to capture a plurality of images (e.g., the 3D scan) of a particular product using one or more image-capturing devices, such as CPP units 302, 304, 306, and 308. For example, the rotating scanner may be used to collect a specified number of separate images of the object(s) (e.g., 120 images), which may correspond to 5 (five) different image-capturing devices, each capturing 24 (twenty-four) images of the object(s). Each of the image-capturing devices used to generate the 3D scan may be mounted at a specified angle as the one or more objects rotate upon a platter, thus allowing the image-capturing device to capture the object(s) at a plurality of different angles. Additionally, or alternatively, the one or more objects may remain stationary as the one or more image-capturing devices rotate around the object(s) to capture the specified number of images. The images captured and 3D scan created with the rotating scanner may be utilized to develop and render the 3D model of the tracked object(s). In other embodiments of the present disclosure, one or more remote computing devices may create the virtual 3D model of the object(s) and, further, may send data indicating the 3D model to the projection system for storage and/or subsequent use by the system to render the received 3D model onto one or more physical objects.

After obtaining or creating the virtual 3D model of the one or more tracked physical objects, the system may simplify the 3D model by splitting and/or segmenting the model into one or more regions of interests, or in other words, splitting the model into one or more object components. For instance, in the example where the tracked object(s) is/are footwear, the one or more regions of interest may include the various components of the footwear, such as a vamp, a heel, a mid-sole, an upper, and the like. The system may split and/or segment the 3D model into various components using standard manual 3D modeling techniques and/or application software, such as "3D Coat." In some instances, the system may retrieve data from a server, database or other suitable storage, indicating information and characteristics of a first object, such as a pre-stored model of an article of footwear. The retrieved data may further include information indicating one or more pre-defined regions of interest associated with the first object. After retrieving the data, the system may determine one or more regions of interest for the virtual 3D model by comparing one or more portions of the 3D model to corresponding portions of the first object. For example, in the instance where the first object is an article of footwear, the system may compare a portion of the first object (e.g., a vamp, a heel, a mid-sole, an upper, etc.) to a corresponding portion of the 3D model. During the comparison, the system may allocate regions of interest to the 3D model based on the location of one or more predetermined regions of interest associated with the portion of the first object that is being compared with the 3D model.

In some aspects of the present disclosure, the system may retrieve data from a server, database or other suitable storage, indicating contour information for a plurality of pre-stored (e.g., pre-built) models—for example, the first object discussed in the preceding paragraph. This contour information may identify one or more contours associated with (or previously detected for) each of the pre-stored models. The system may compare a detected contour associated with the 3D model—for example, as discussed herein—to the contour information associated with one or more of the plurality of pre-stored models to determine a particular pre-stored model for use in determining position and orientation information of the object being tracked, as will be described in further detail below. The system may compare contour information for the pre-stored models to the detected contour for the 3D model when determining the position, location, and orientation of the object being tracked. The plurality of pre-stored models may include one or more models scaled models, which correspond to a different size of the representative object (e.g., an article of footwear). Accordingly, by comparing contour information for pre-stored models of various sizes, the system is configured to use a contour to determine the position and/or orientation of an object (e.g., article of footwear), even if a detected contour of the exact size of the tracked object is not included in a predetermined model geometry.

The scalability of the system is improved by segmenting the 3D model into one or more regions of interest, thereby allowing the system to render a larger range of object sizes (e.g., footwear sizes). Additionally, the scalability of the system is also improved by using a sub-set of 3D models to render a larger range of object sizes by selectively scaling the geometry of the closest matching object size. The system is capable of selectively scaling the geometry of the closest matching object size given that the geometry of the object, such as footwear, apparel, athletic equipment, and the like, typically changes according to size in a fairly predictable manner.

Figure 5A:
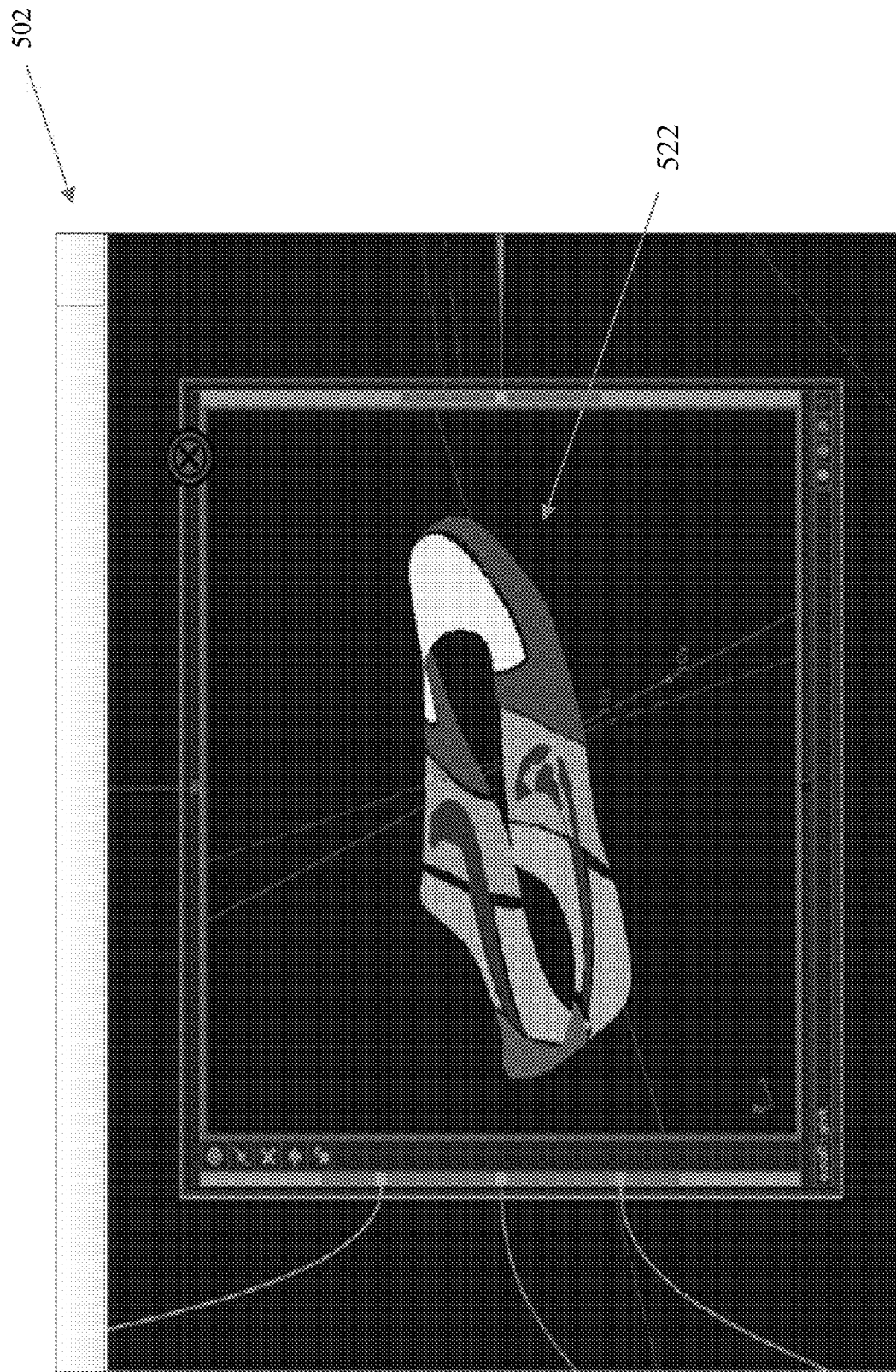
FIGS. 5A-5C show examples of rendering and projecting content onto physical objects in accordance with example embodiments.
Figure 5B:
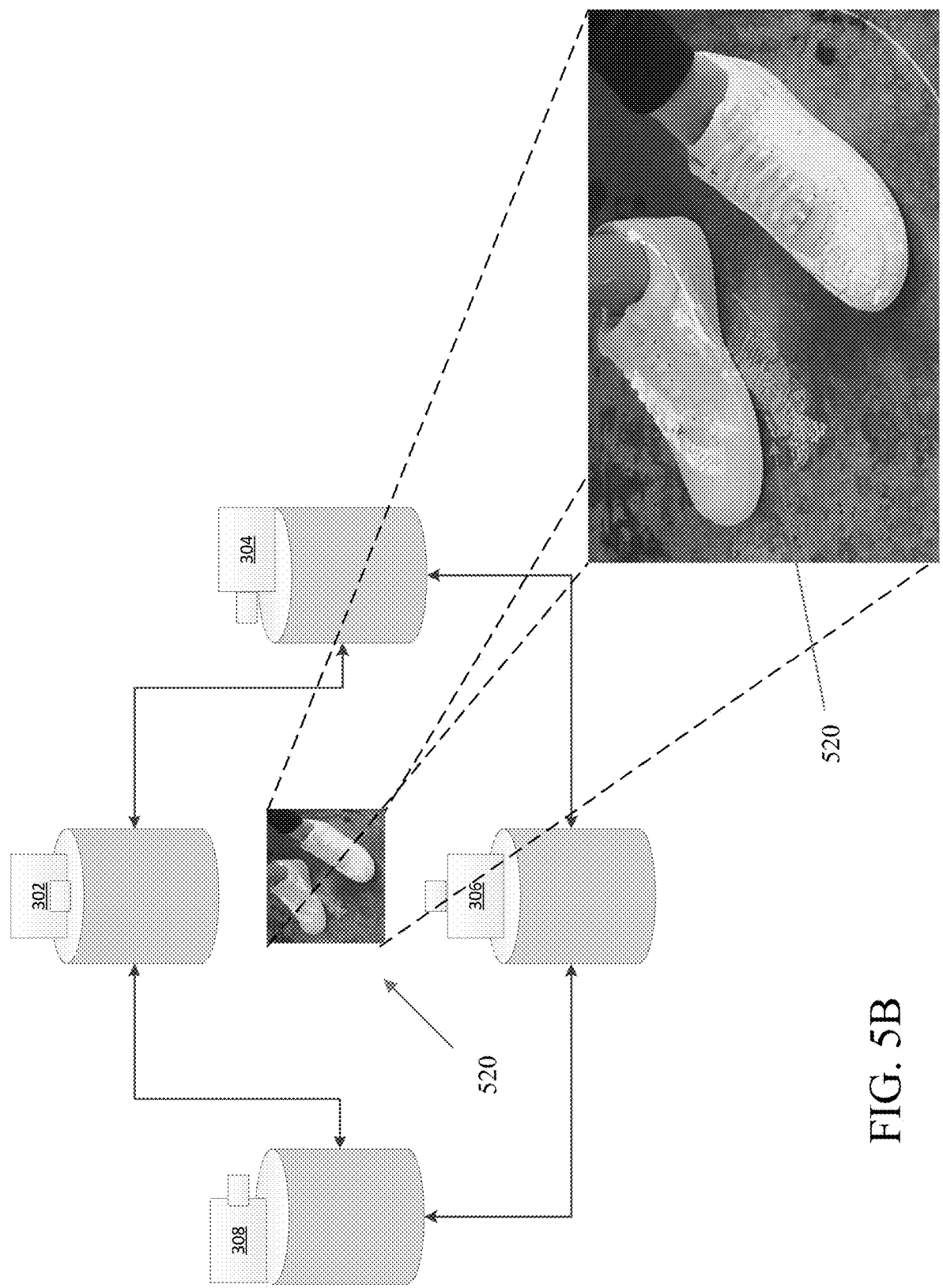
Figure 5C:
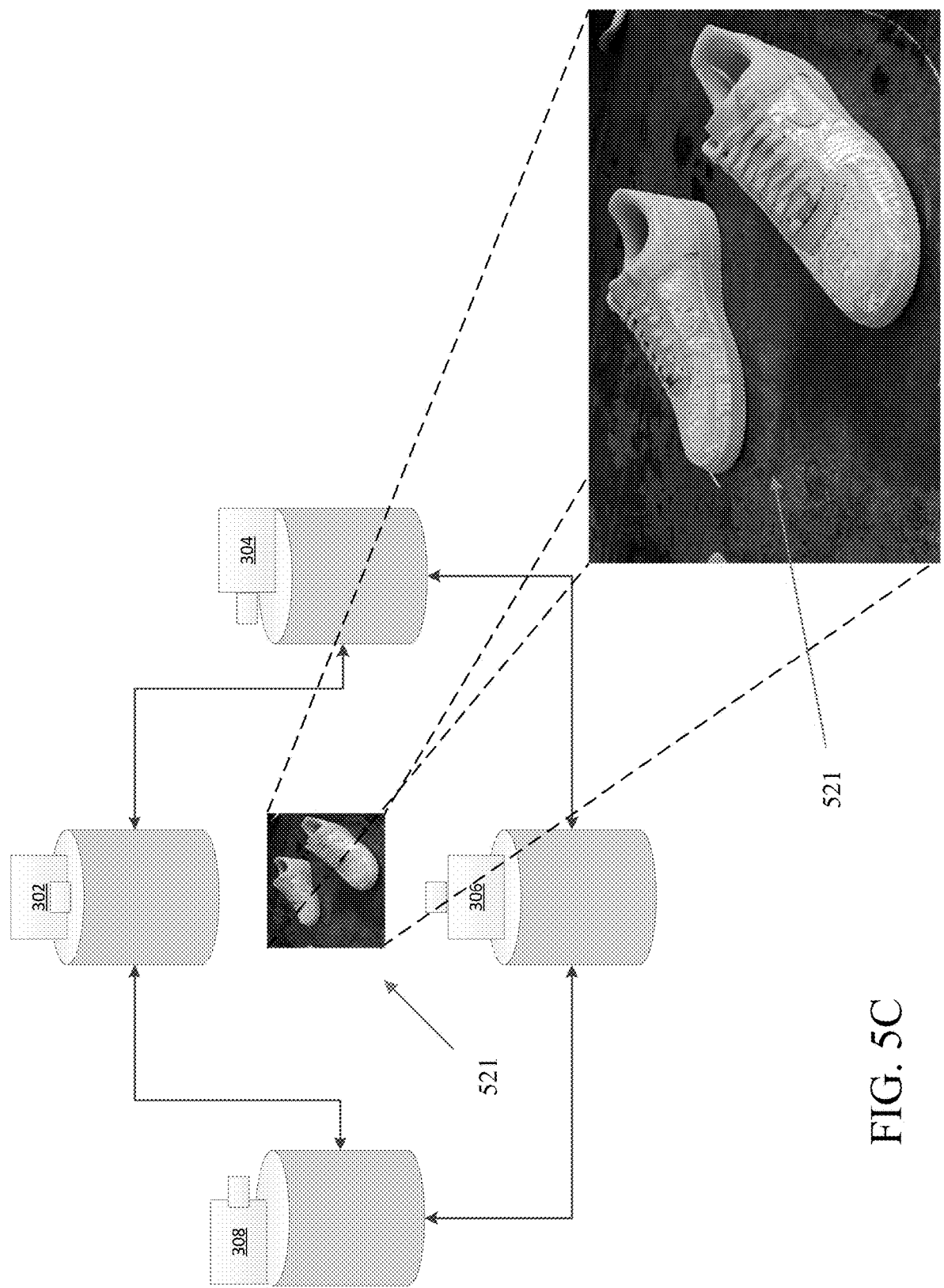

The resulting 3D model is rendered by the system, in real-time, at the tracked position and/or angle received from the tracking engine. As shown in the example in FIG. 5A, the system may use a pre-built 3D model of the tracked object(s) (e.g., element 522) and, further, may position the 3D model at the X/Y coordinate positions and rotation angles specified by data obtained via the tracking engine. The pre-built model utilized by the system may be retrieved from a database, server or other suitable storage maintaining a plurality of pre-built models, for example, the pre-stored models discussed herein. The rendered 3D model, which is aligned to match the position and rotation angle of the tracked physical object, may be displayed by the system via a user interface, as illustrated by element 502 in FIG. 5A. The system may utilize virtual cameras to render the resulting/final scene of the tracked object from the perspective of each projector (e.g., CPP unit), which the system utilizes to project the rendered/resulting 3D model onto the tracked physical object. The system may utilize one or more projectors to output the rendered 3D model, which is aligned both by position and angle with the tracked object, onto the physical object, as shown in FIGS. 5B and 5C. In particular, as shown in FIG. 5B, one or more of the CPP units (e.g., CPP units 302, 304, 306, 308) project the rendered 3D model (e.g., model 522) onto the tracked physical object, which in this example is a pair of white tennis shoes. As depicted by element 520 in FIG. 5B, the alignment of the rendered 3D model being projected onto the white tennis shoes is off, causing a portion of the projected 3D content to miss the physical object and spill-over onto other surfaces (e.g., the floor).

However, as explained above, given that the tracking engine and rendering engine of the system operate in real-time and, further, that the tracking engine tracks the location and rotation angle of the physical object over a predetermined time period, the system is able to determine (in real-time) the most current position and angle information for the tracked physical object. Accordingly, the real-time (or updated) angle and position information, which is obtained by the tracking engine and sent to the rendering engine, thereby allows the system to appropriately project, via the one or more projectors, the rendered 3D model onto the tracked physical object(s). For example, as illustrated by element 521 of FIG. 5C, the system may dynamically, and in real-time, use updated position/angle information to project the rendered 3D model/content onto the tennis shoes, such that the rendered 3D model/content is more closely aligned with and projected onto the tracked physical object, thereby minimizing any spill-over effect, if any, and improving the projected image quality of the 3D model/content displayed on the physical object. As such, to the extent that the tracked physical object moves or is moved within the tracking space, the system may dynamically update, using updated position and/or angle information for the object, where respective projectors will project the rendered 3D model/content onto the object, thereby ensuring that the projected content is aligned with the physical object.

Figure 2:
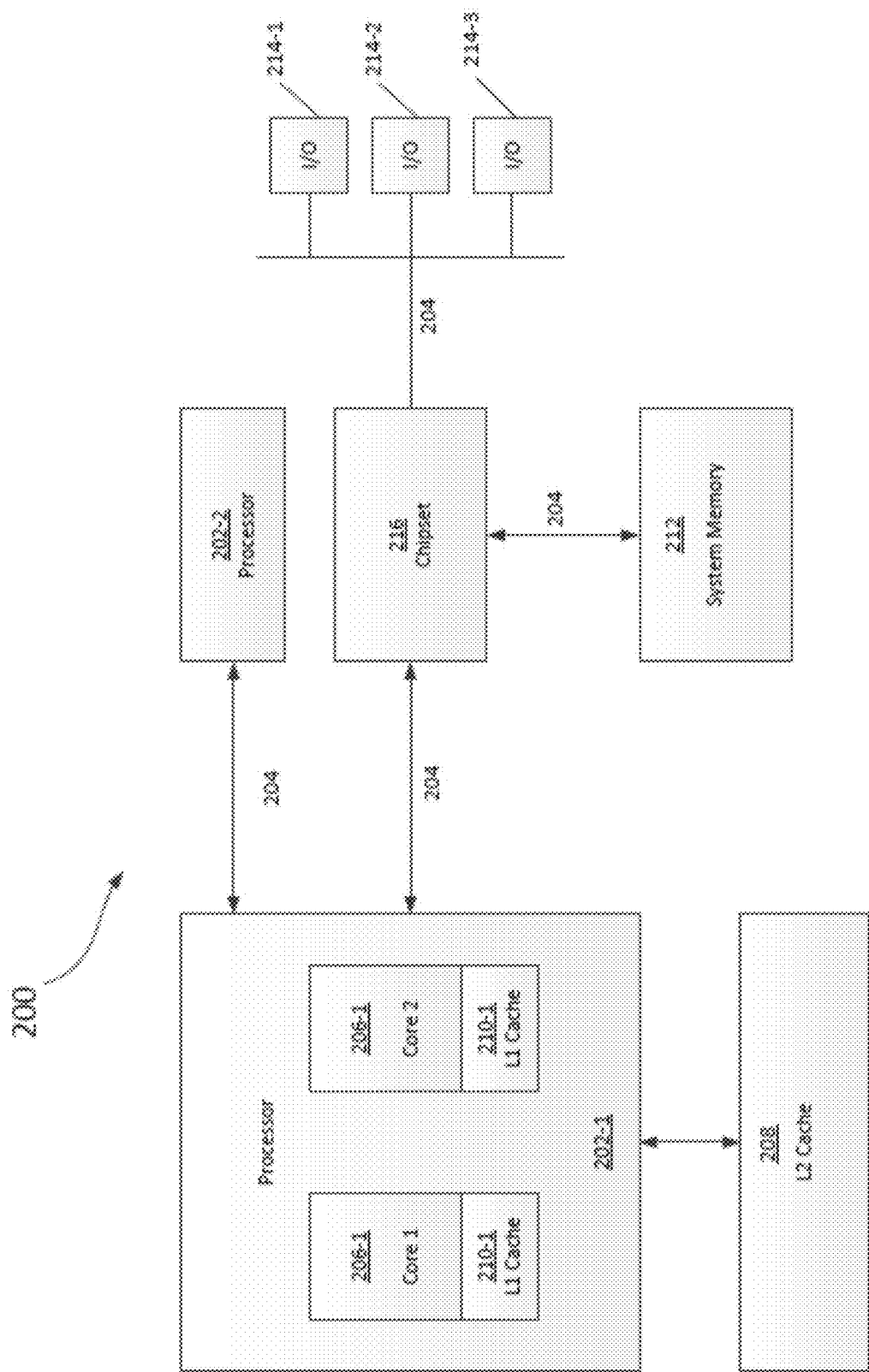
FIG. 2 illustrates an example computer device that may be part of or in communication with the system of FIG. 1.

The system may not attempt to infer the size and/or other characteristics of the physical object being tracked (e.g., shoe size, model of shoe, etc.), as this information may be manually specified by the user or system administrator using an input device, such as the one or more input devices previously discussed in relation to FIGS. 1 and 2.

Additionally or alternatively, the system may, wholly or in-part, determine characteristic information (optionally including shoe size, model of shoe etc.) concerning the tracked object based on the image data and other information collected/obtained by the image-capturing device(s) and/or the tracking engine.

In other embodiments of the present disclosure, rather than rendering the virtual 3D model on the object by attempting to match a known geometry of the physical object, as discussed above, the system may render a projection of a large amorphous object that may fully and/or substantially cover the tracked physical object (e.g., covering 75%-99% of the object). The system may then dynamically render a mask image using 3D image data (including depth data obtained by the one or more image-capturing devices) to create a "green screen" effect, thereby removing any spill-over from the larger amorphous object that is being rendered on the tracked object(s). As noted above, given that this process of rendering content may not require using a pre-built 3D model matching the physical object(s) being tracked—for example, one or more of the virtual 3D models discussed herein—the system may utilize less data processing resources to render 3D content onto the tracked object via use of the mask image, thereby improving the scalability of the system, making the system more flexible in the types of physical objects that may be tracked/rendered, and improving the efficiency in which those objects are tracked/rendered by the system. Likewise, given that the present system may not require using a pre-built 3D model to project 3D content onto a tracked object, the system is capable of dynamically adapting the manner in which 3D content is projected onto different objects having a variety of shapes, sizes, and configurations. Additionally, by not relying on a pre-built 3D model to render the projected 3D content, the system has more flexibility to project 3D content onto a variety of different object surfaces, including, but not limited to, apparel, athletic equipment, and/or the customer's body. Accordingly, such flexibility allows the system to operate more quickly and efficiently, without the limitation of requiring a pre-built 3D model and, further, without wasting additional time and computing resources by first obtaining a specific 3D model and then having or attempting to map that model to the physical object prior to the system projecting 3D content onto the object.

For either the model-based or non-model-based methods of rendering 3D content onto one or more physical objects, as discussed above, the system may use a "projector prioritization" technique to compare the average surface normal of the 3D geometry of the one or more tracked objects against an angle of each projector (e.g., CPP unit). In some instances, the system may compare the average surface normal of the 3D geometry of the object on a per-component basis against the angle of each projector. This comparison may be performed for each component (e.g., region of interest) of the tracked object. Thus, the system may display the 3D content using only the one or more projectors, of the plurality of available projectors, which has/have the most favorable or optimal view of the 3D content. In some instances, the 3D components of the content/model may only be projected by the system using the one or more projectors which are most directly facing each region of the tracked object that correspond to said component(s) being displayed/projected. The system may repeat this process for every frame (i.e. of the projection over time) such that the projector prioritization updates as the position and angle of the tracked object(s) change, thereby ensuring the best image quality possible, and further to ensure that the rendered content is properly aligned with the one or more tracked objects. For the avoidance of doubt, by using a projector that most directly faces the respective region of the tracked object (e.g., orthogonally faces a surface of the respective region of the tracked object), the impact of any lateral misalignment of the projected image (i.e. misalignment in a plane normal to an axis between the tracked object and the respective projector) is reduced. In contrast, as a surface of the respective region becomes more inclined relative to the respective axis to the projector, then the misalignment on the object would increase for a given lateral misalignment in the plane normal to the axis.

The system may store image data obtained by the one or more image-capture devices that are used to monitor and/or track an object(s). Additionally or alternatively, the system may also capture images/video of the resulting/rendered 3D content that is projected onto the physical object using one of more of the system's projectors and/or image capturing devices (e.g., cameras). The system may transmit, upon a request by one or more users, the stored and/or captured image data indicating the rendering of the 3D content onto the physical object. In some examples, a user may associate the requested image information with one or more social networking accounts or platforms, such as a NIKE+ account. By associating this image information, indicating the rendering of 3D content onto physical objects, with their social networking account(s), the user may share their experience, along with the requested image information, with other users of the social networking platform.

For example, after a user has finished projecting the rendered 3D content onto a desired object, e.g., footwear, the user may be given an option, via the user interface, to store images of the 3D rendering and projection. Additionally or alternatively, the user may be given the option to purchase consumer goods associated with the tracked physical object(s) and the 3D content/designs being rendered and projected thereon. For example, the user may select various features from the user interface, and/or a design website, to view and/or purchase consumer products relating to the tracked physical object(s) and the 3D content (and/or designs) that have been projected onto the object(s). For instance, the user may be presented with the option to purchase footwear that is similar to the tracked physical object, and that may have designs, model types, or colorways that are similar to the 3D model that has been rendered and projected onto the physical object.

The user may select a "save and share" option from the user interface and/or design website, which may launch a new webpage/website or interface screen presenting various options to the user, including one or more selections relating to the electronic storage and sharing of the captured images of the projection of 3D content onto the tracked object. For instance, the "save and share" website/screen may simply cause the desired image/content to be electronically stored or "saved" into a computer memory without additional screens or information. This image content may be stored on computer memory residing in the local computing device operated by the user, a remote computing system operated by the entity maintaining the design website, or any other suitable computing storage device. Image information of the 3D content being projected onto the tracked object(s) may be stored to a user's social networking account, and may be acted upon or viewed by other users in any suitable fashion. Users may provide feedback on the stored image content and/or may rank, score, or otherwise critique the content, including the rendered 3D content and underlying 3D models used to render the 3D content onto the physical object.

As discussed above, the user's stored image content may be posted to a social networking website. A user having an account or the ability to utilize a social networking website may be able to "post" the images of the rendered 3D content on the social networking website. Many social networking websites have a user profile webpage that allows the user to post personal items for viewing by other users. The users may wish to display their image content on their user profile webpages offered by the social networking websites. Such social networking websites may be maintained by the same entity that maintains the design website and/or user interface, such as the manufacturer of consumer products associated with the tracked object, or they may be maintained by a third party, such as Facebook®, Twitter®, and the like. Users may also wish to post their stored image/video content on a personal website or on another web application.

Figure 6A:
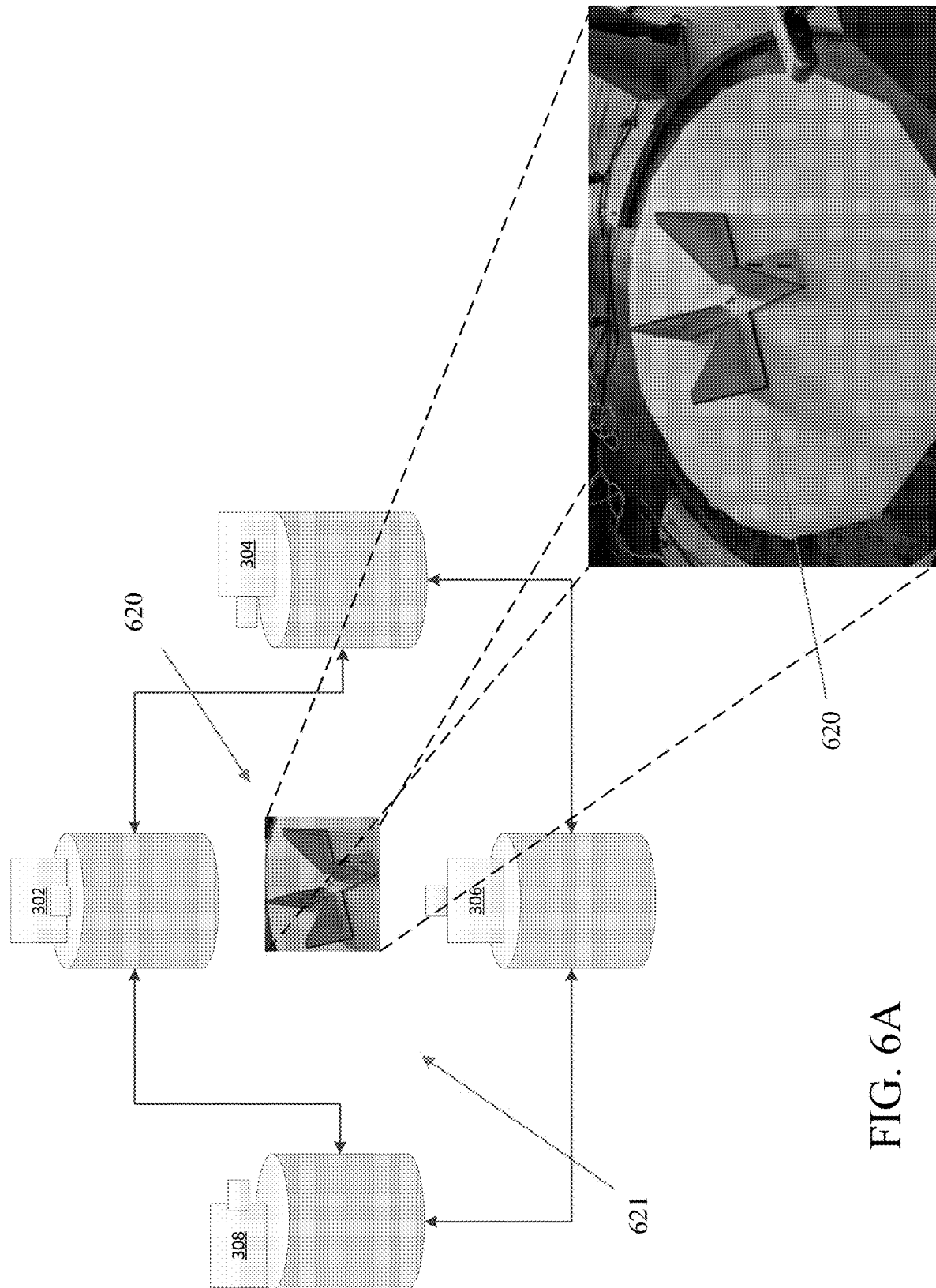
FIGS. 6A-6C show examples of calibrating projection devices using reference objects in accordance with example embodiments.

IV. General Description of Projector Alignment and Calibration Performed by Dynamic Projection Mapping System According to Examples of Present Disclosure As noted above, the system may utilize one or more projection device (e.g., projectors, CPP units) to project 3D content onto one or more tracked physical objects. In some examples, the projection mapping system may calibrate these one or more projectors and the rendering/projection coordinate space (discussed above in relation to FIGS. 4A and 4B), against a physical reference object (e.g., "calibration object") having a geometry that is known to the system. This calibration is achieved, by the system, using a multi-data point technique for matching projector pose, position, and/or location against that of the known 3D model. For example, as shown in FIG. 6A, a known calibration object is placed within tracking space 621, which is encircled and/or surrounded by a plurality of CPP units (e.g., CPP units 302, 304, 306, and 308). One or more of the CPP units may be calibrated by the system against the known geometry of the calibration object to establish the rendering/projection coordinate space. This is achieved by the system visually aligning depth sensor data, obtained by one or more depth sensors and/or the CPP units, with a 3D model of the calibration object.

Figure 6B:
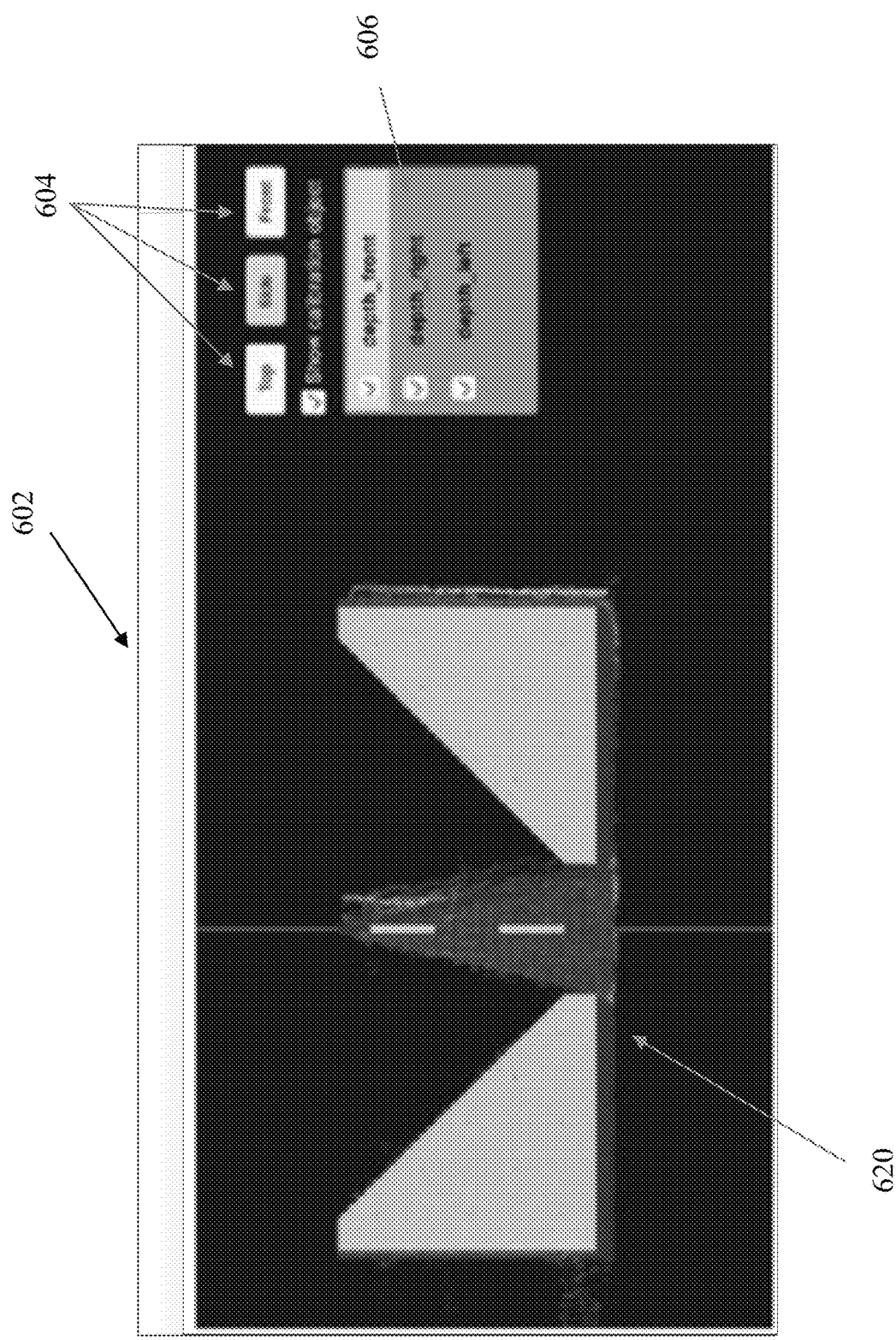
Figure 6C:
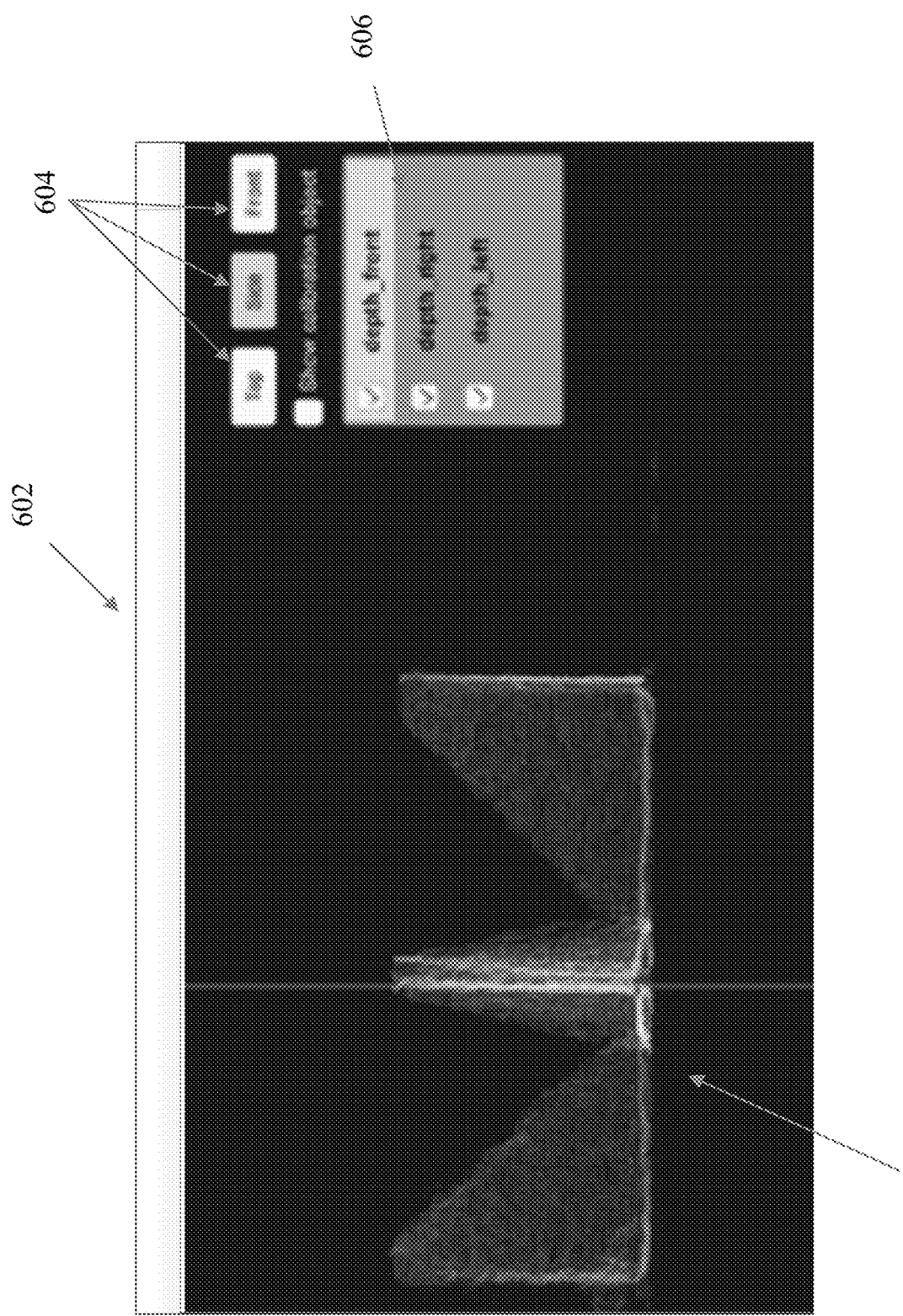

For example, as shown in FIG. 6B, the system may provide a user interface (e.g., element 602) enabling the user (e.g., system administrator) to align depth sensor data with the 3D model of the calibration object (e.g., element 620). As shown in FIG. 6B, the user may interact with various displayed interface elements (e.g., elements 604) to access different views (e.g., top, side, front) of the depth sensor data and the 3D model of the calibration object. Additionally, the user (e.g., administrator) may selectively identify which of the various types of depth data (e.g., front, right, left, etc.) should be displayed via the interface (e.g., element 606), as well as whether the calibration object should be displayed along with the depth data. Further, the system may enable the user, via the user interface, to align depth sensor data from multiple sources (e.g., multiple depth sensors, CPP units) with the 3D model of the calibration objection. For example, as shown in FIG. 6C, the user may interact with various displayed interface elements (e.g., elements 604) to access different views (e.g., top, side, front) of depth sensor data obtained from multiple sources and, further, to align this depth sensor data with the 3D model of the calibration object, as illustrated by element 622. In some instances, rather than the user performing the above-discussed alignment and calibration, the system may automatically align image data (e.g., depth sensor data) with the 3D model of the calibration object, thereby calibrating one or more of the CPP units against the known geometry of the calibration object and establishing the rendering/projection coordinate space with which to track physical objects and project content thereon.

As discussed above with respect to FIGS. 6B and 6C, for one or more of the projectors used to project the rendered 3D content onto the tracked object(s), the system may calibrate these projectors against the known geometry of the calibration object to establish a projection/rendering coordinate space. Additionally, the system may use data points, obtained from one or more CPP units measuring the depth and/or position of the tracked object, to visually align the image/depth data against the known geometry of the calibration object, thereby establishing a tracking coordinate space. Accordingly, after the one or more projectors and/or image-capturing devices have been calibrated by the system, the coordinate space in the real-word would then match that of the 3D sensors and the 3D rendering pipeline discussed above. This calibration processes thus results in a consistent coordinate space throughout the tracking and rending processes performed by the system, thereby enabling the rendered 3D content to match up with, and be properly projected onto, one or more tracked physical objects.

Figure 7:
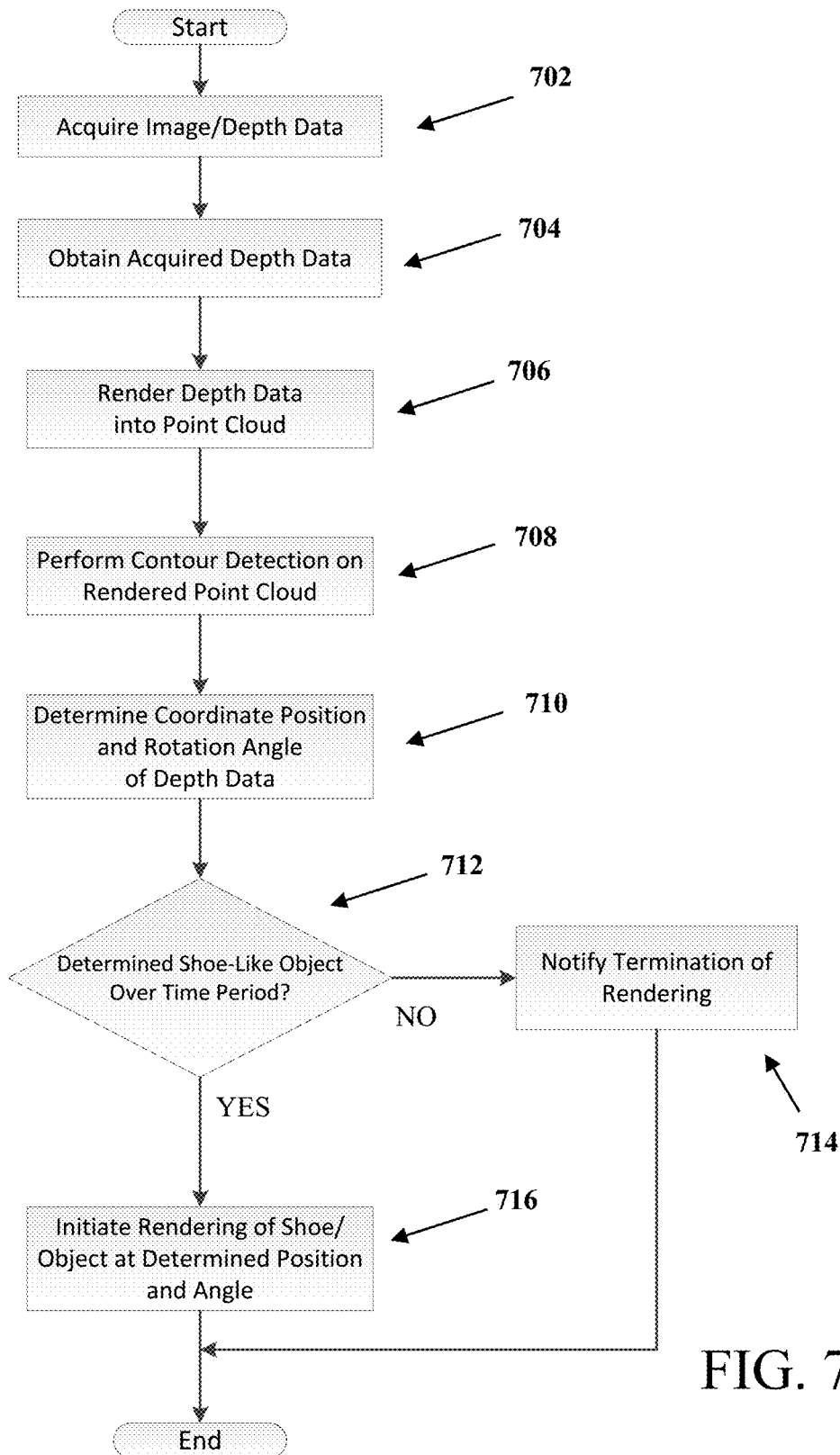
FIG. 7 shows a method of tracking objects in accordance with example embodiments.

V. Description of Processes and Techniques for Tracking and Rendering Content Via a Dynamic Projection Mapping System According to Examples of Present Disclosure FIG. 7 illustrates an example method for sensing and tracking one or more objects using dynamic projection mapping according to one embodiment of the disclosure that may be performed by one or more computing devices. When describing the steps of the method below, the term "system" may be used when referring to each component, either singularly or collective, employed at each step of the method. Such usage is merely for ease in discussing the method, and should not be interpreted as limiting the exact embodiment in which the following method may be performed.

At step 702, the system acquires image/depth data associated with a tracked object. As discussed above, the system may comprise one or more image-capturing devices (e.g., CPP units) that obtain image data, including depth information, of a tracked physical object. The one or more image-capturing devices may capture this image data on a per-frame basis and at a particular frame rate. In some examples, the one or more image-capturing devices may be configured to capture the image/depth data at a frame rate of approximately 30 frames-per-second, although, as noted above, the image capturing device maybe configured to capture image data at other frame rates. In some examples, the one or more image-capturing devices may be configured to capture the image/depth data at a frame rate specified by the user or a system administrator.

At step 704 the system obtains the image/depth data that was acquired at step 702. For example, the system may request image/depth data from the one or more image-capturing devices that acquired the image/depth data at step 702. In other examples, the one or more image-capturing devices may transmit the acquired image/depth data to one or more centralized computing devices of the projection system, which is/are executing the rendering engine to further process the image/depth data.

At step 706, the system processes the image/depth data obtained at step 704 to render one or more point clouds of the tracked object for further analysis. As discussed above concerning FIGS. 4A and 4B, a point cloud may be defined by various coordinate systems/spaces, e.g., a 3D Cartesian coordinate system, and may be generated using image/depth data obtained from one or more CPP units. For example, referring to FIG. 3, after capturing image/depth information relating to footwear 320 using one or more CPP units at varying locations and from varying angles, the system may generate and/or store several data points returned from (and that cover) the surface(s) of the footwear 320. The system may continuously capture image/depth data over a specified time period (e.g. 15 seconds) to generate one or more point clouds relating to the tracked object(s), e.g., footwear 320, as illustrated in FIG. 4A.

At step 708, the system performs contour detection on the one or more point clouds rendered at step 706 to determine if the tracked object corresponds to a particular object type. For example, the system may perform contour detection on the one or more rendered point clouds to determine if the tracked physical object corresponds to a footwear-like object. As discussed above, the system is not limited to tracking only footwear or footwear-like objects, and may also be configured to track other objects, such as consumer products, including apparel and/or athletic equipment. At step 708, the system may use the image/depth data obtained at step 704 to perform, as shown in FIG. 4A, contour detection on a rendered point cloud by detecting one or more boundaries of the tracked object as represented via the rendered point cloud and collected image data. As discussed above with reference to FIGS. 4A and 4B, the system may perform the contour detection by processing the image/depth data, captured by (or obtained from) the one or more image-capturing devices at steps 702 and 704, to identify one or more contours of the tracked object.

At step 710, the system tracks the coordinate position and/or rotation angle of the image/depth data and the one or more contours detected at step 708. The system may track the position and angle information associated with the detected contours in relation to a specified plane/region, such as the ground level and/or within a specified proximity to a base on which the tracked object is sitting. The system may determine the X/Y position and rotation angle information of the one or more detected contours based on the surface area of image/depth data found to be within a particular region of the coordinate space. For example, when the tracked object is footwear, the system may analyze the surface area of the depth data within a specified "foot region" (e.g., at ground level) and "ankle region" (e.g., above the ground level).

At step 712, the system continues to track the position and/or rotation angle information of the image/depth data to identify particular objects over a specified time period and to determine whether the expected object is continuously within the tracking space. For example, in the event that the tracked physical object is footwear, the system looks to identify shoe-like objects within the image/depth data, over time, to determine if the footwear is continuously inside the tracking space. As discussed above, the system may track the position and/or angle of the depth/image data, including one or more detected contours over a specified time period. The system administrator or user may establish/designate the time period in which the system attempts to track object using the obtained image/depth data. At step 712, the system may continue to track the position and/or angle of the image/depth data over a time period such that the detected contour is considered to be valid by the system after existing for a predetermined period of time (e.g., a quarter of on second), within the tracking space. As discussed above, ensuring that the detected contour is valid enables the system to operate more efficiently by excluding false positives.

In some aspects of the present disclosure, the system may utilize the one or more point clouds rendered during step 706, and/or the information obtained while tracking the position and/or rotation angle information of the image/depth data during steps 710 and 712, to retrieve a predetermined three-dimensional model corresponding to the object being tracked. The three-dimensional model may be retrieved from a server, a database, or some other suitable storage comprising a plurality of three-dimensional models corresponding to various objects. For example, the database may comprise a plurality of different pre-stored footwear models, and each of the stored footwear models may include data delineating various characteristics for each model, such as associated point clouds, contour information, regions of interest and the like. Various types of data delineating characteristics of a model may be stored in the database. This database or other suitable storage may be the same or similar to the other databases discussed herein. The system may utilize the point cloud and tracking information obtained during steps 706, 710 and/or 712 to compare the object being tracked to the plurality of stored three-dimensional models and their associated characteristic data. Based on this comparison, the system may identify one or more pre-stored models having characteristic data that is similar the object being tracked. For instance, the system may determine that the point cloud and tracking information for the object is similar to characteristic data for a particular pre-stored model if such information is within a threshold standard deviation of the characteristic data. In some instances, the system may compare the point cloud and tracking information for the object to the characteristic data for a pre-stored model to determine a level of similarity between the tracked object and the pre-stored model. Similarity may be based on a combination of how similar the point cloud and tracking information for the object is to related characteristic data for the pre-stored model. The system may weight certain metrics indicating point cloud and tracking information more highly than others, or may weight each metric equally. For example, the point cloud and tracking information may provide information on three different metrics, and may compare the related characteristic data for the pre-stored model to each of the three metrics. The system may determine a ratio of one or more metrics for the tracked object's metric(s) to one or more metrics for the pre-stored model. The system may determine a sufficient level of similarity if the ratio is above a threshold vale (e.g., more than 60%, 70%, 80%, 90%, etc.).

At step 712, if the system determines that a specified object (e.g., a shoe-like object) has been identified within the image/depth data for a specified time period, the method may proceed to step 716, where the system transmits the position and angle information determined at step 710 to a software application executed on one or more computing devices for rendering 3D content (e.g., rendering engine). At step 716, the system may use the position and angle information determined at step 710 to begin rendering 3D content associated with the tracked physical object using the position/location and angle information, as determined by the tracking engine. If the system determines that the specified object (e.g., the shoe-like object) has not been identified within the image/depth data for the specified time period, the method may proceed to step 714, where the system may notify the system administrator or other user(s) to stop rendering the tracked object.

In the example embodiments described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting.

Figure 8:
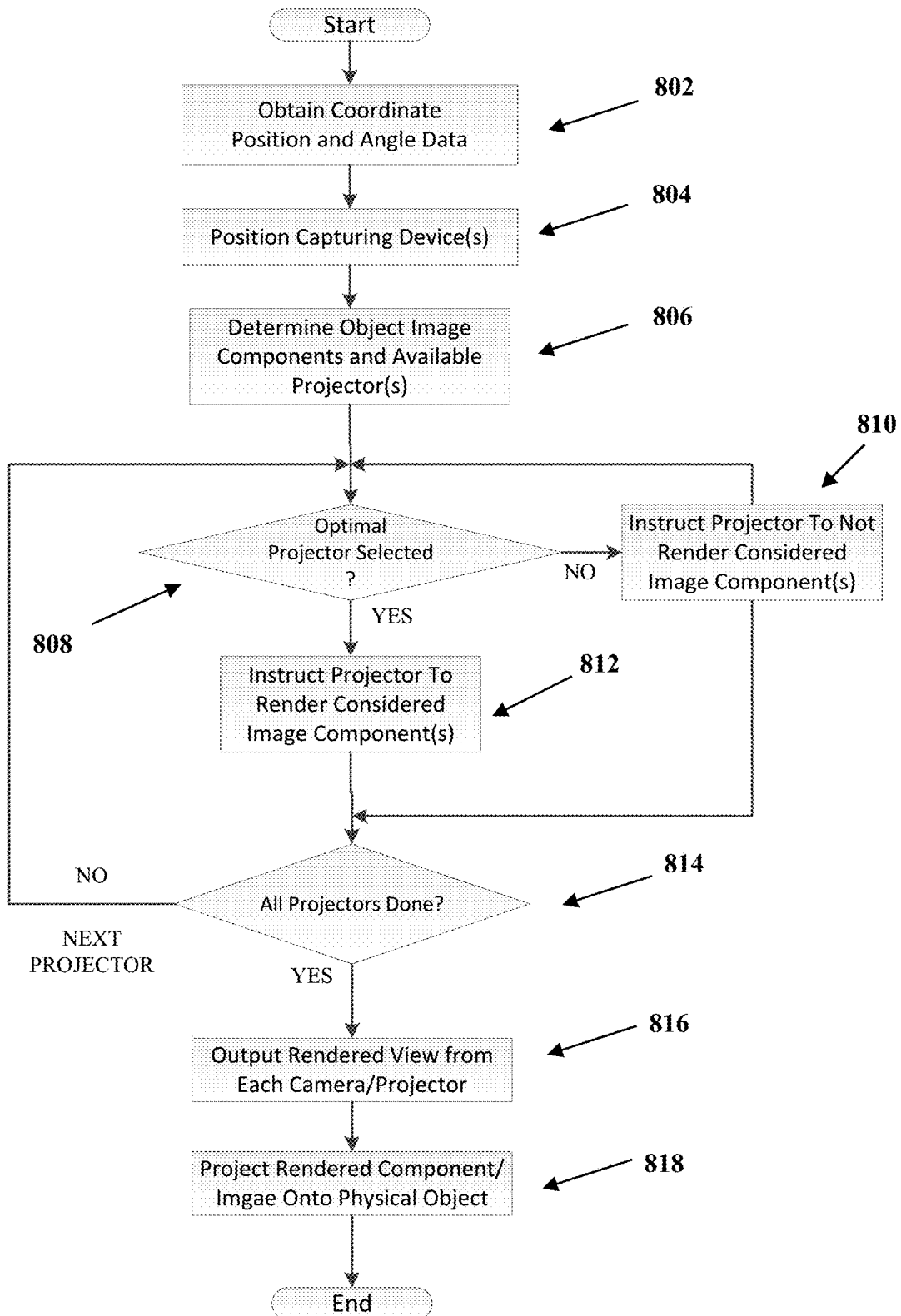
FIG. 8 shows a method of rendering and projecting content onto objects in accordance with example embodiments.

Referring now to FIG. 8, this figure illustrates an example method for rendering and projecting virtual designs (e.g., 3D content) onto a tracked physical object using dynamic projection mapping according to one embodiment of the disclosure that may be performed by one or more computing devices. When describing the steps of the method below, the term "system" may be used when referring to each component, either singularly or collective, employed at each step of the method. Such usage is merely for ease in discussing the method, and should not be interpreted as limiting the exact embodiment in which the following method may be performed. Further, the following method may be performed along with or in addition to the method described above with reference to FIG. 7.

At step 802, the system obtains coordinate position and rotation information of image/depth data associated with a tracked object. As discussed above, the system may utilize a tracking engine (e.g., software application), executed on one or more computing devices, for sensing and tracking a physical object. As described above concerning step 710 of the example method illustrated in FIG. 7, the tracking engine also determines X/Y position and rotation angle information of the tracked object using image/depth data obtained by CPP units. In some examples, the tracking engine may be executed on one or more computing devices remote from (and/or within) the projection mapping system. In examples where the tracking engine is executed on remote computing devices, the system may request/obtain from the one or more remote computing devices the coordinate position and rotation angle information of image/depth data associated with the tracked physical object.

At step 804, the system positions virtual cameras in the 3D scene from the perspective of the one or more projection devices for projecting 3D content onto the tracked physical object. As explained above, the system may obtain a pre-built 3D model of the tracked object(s) (e.g., element 522) and, further, may position the 3D model at the X/Y positions and angles received at step 802. The rendered 3D model matching the position and angles of the tracked object may be displayed by the system via a user interface, as illustrated by element 502 in FIG. 5A. At step 804, the system may utilize virtual cameras to render the resulting/final scene of the tracked object from the perspective of each image projection device (e.g., projector, CPP unit) that the system utilizes to project the rendered/resulting 3D model onto the tracked object. The system may utilize one or more projectors to output the rendered 3D model and, further, to align the rendered 3D content with the tracked physical object by position and rotation angle when projecting the 3D content onto the tracked object, as shown in FIGS. 5B and 5C.

At step 806, the system determines which projection devices may be used to project one or more 3D mode/content components onto the tracked physical object. As discussed above, the system may use projector prioritization techniques to determine which projectors have the most favorable view for projecting a component (e.g., a region of interest) of the 3D content. At step 806, the system may determine one or more projection devices, of the plurality of projection devices within the system, that may be used to project the 3D content onto the tracked object. At step 806 the system may split/segment a 3D model that was obtained and/or generated by the system, into one or more components (e.g., regions of interest), which correspond to different regions of the object. For instance, in the example where the tracked object(s) is/are footwear, the one or more regions of interest may include the various portions/segments of the footwear, such as a vamp, a heel, a mid-sole, an upper, and the like.

At step 808, the system determines, for each of the one or more projection devices determined at step 806, which projection device(s) is/are best suited to project one or more particular 3D components onto the tracked physical object. For instance, at step 808, for a first projection device, of the one or more projection devices determined at step 806, the system may compare the average surface normal of (e.g., perpendicular to) the 3D geometry of the tracked object against an angle of the first projector (e.g., CPP unit). At step 808, the system may also compare the average surface normal of the 3D geometry on a per-component basis against the angle of the first projector. In other words, although not shown in FIG. 8, this step may be performed for each component of the 3D content/model, which correspond to different regions of interest of the tracked object determined at step 806. In some examples, at step 808, the system may store in a database (or other suitable storage) an indication as to which projector has been determined by the system to be best suited for displaying/projecting a particular 3D component. In the event that the system determines that a different projector is better suited for displaying the 3D component, the system may modify the stored indication to assign/associate the 3D component with the better suited projector. At step 808, the system may query the database to determine whether a better-suited projector for displaying a particular 3D has been previously determined.

At step 808, if the system determines that the current projector is not the optimal projector for displaying a 3D component, the method may proceed to step 310 where the system may instruct the current projector to not render the one or more 3D components considered by the system at step 808. As discussed above, in some instances, the system may consider a plurality of 3D components when determining whether the current projector is the optimal projector for rendering a specific 3D component, of the plurality of 3D components. In such instances, at step 310, the system may instruct the current projector to not render each of the one or more 3D components which the system determined (at step 808) would not be optimally rendered by the current projector.

At step 808, if the system determines that the current projector is the optimal projector for displaying a 3D component, the method may proceed to step 812, where the system may instruct the current projector to render the one or more 3D components considered by the system at step 808. At step 812, the system may store an indication that the current projector is the optimal projector for rendering the 3D component. As discussed above, in some instances, the system may consider a plurality of 3D components when determining, at step 808, whether the current projector is the optimal projector for rendering a specific 3D component of the plurality of 3D components. In such instances, at step 812, the system may instruct the current projector to render each of the one or more 3D components which the system determined (at step 808) would be optimally rendered by the current projector.

At step 314, the system determines whether each of the projectors determined at step 806 have been considered by the system (at step 808) to determine whether the projector is optimal for rendering one or more 3D model/content components onto the tracked object. If the system determines at step 314 that additional projectors still need to be considered, the method may return to step 808, where the system determines whether a subsequent projector is the optimal projector for displaying one or more 3D components. The system may perform steps 808 through steps 814 until each of the projectors determined by the system at step 808 have been considered. At step 314, if the system determines that no additional projectors need to be considered, in other words, each of the projectors determined at step 806 have been considered by the system, the method may proceed to step 816.

At step 816, the system outputs, using the one or more projectors identified (at steps 810 and 812) as being an optimal projector, a rendered view of the 3D components. For example, at step 816, the system may instruct each projector identified/determined at step 812 to output their respective virtual camera from the 3D scene onto the physical object. At step 818, the system projects, using each projector identified/determined at step 812, the one or more rendered 3D components onto the physical tracked object (e.g., the physical shoes, as illustrated in FIGS. 5B and 5C. As noted above, the system displays/projects the 3D content using only those projectors that have been identified as being optimal and providing the best image quality, or in other words, those projectors having the most favorable view of the 3D content and/or that are most directly facing each region of interests of the tracked object, which corresponds to one or more 3D content/model components. The system may repeat this process for every frame such that the projector prioritization updates as the position and angle of the tracked object(s) changes, thereby ensuring the best image quality possible.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The preceding description is intended to enable others skilled in the art to best utilize the described features in various embodiments and with various modifications as are suited to the particular use contemplated.

What is claimed is:

1. An system comprising:
   one or more image capturing devices;
   a plurality of projection devices; and
   a computing device comprising:
      one or more processors; and
      memory operatively coupled to the one or more processors and storing instructions that, when executed, cause the computing device to:
      obtain, from the one or more image capturing devices, image data associated with an object;
      for one or more contours of the object:
         determine position information or angle information for a contour of the object;
         determine, based on the position information or angle information, a three-dimensional representation of the object; and
      wherein the plurality of projection devices output for display the three-dimensional representation of the object, and wherein the three-dimensional representation is aligned with and projected onto the object.

2. The system of claim 1, wherein the position information or the angle information for the one or more contours of the object is determined by the computing device in real-time.

3. The system of claim 1, wherein the instructions stored in the memory of the computing device, when executed by the one or more processors of the computing device, cause the computing device to:
   determine updated position information or updated angle information for one or more contours of the object; and
   select a set of projection devices, of the plurality of projection devices, to output an updated three-dimensional representation of the object.

4. The system of claim 1, wherein the instructions stored in the memory of the computing device, when executed by the one or more processors of the computing device, cause the computing device to:
send, to one or more of the plurality of projection devices, a message to not output the three-dimensional representation of the object.

5. The system of claim 1, wherein the instructions stored in the memory of the computing device, when executed by the one or more processors of the computing device, cause the computing device to determine the position information or the angle information for the contour of the object by causing the one or more image capturing devices to:
monitor, during a first time period, the position information or the angle information for the contour of the object.

6. The system of claim 1, wherein the three-dimensional representation of the object comprises a footwear design.

7. The system of claim 1, wherein the instructions stored in the memory of the computing device, when executed by the one or more processors of the computing device, cause the computing device to:
determine, based on a stored three-dimensional model, a first set of contours;
determine position information and angle information for each contour in the first set of contours; and
compare, based on respective position information and angle information, the one or more contours of the object with the first set of contours.

8. The system of claim 1, wherein the plurality of projection devices outputting for display the three-dimensional representation of the object further comprises:
projecting, onto the object, one or more images indicating surface regions associated with the three-dimensional representation of the object.

9. The system of claim 1, further comprising an image capturing device, wherein the instructions stored in the memory of the computing device, when executed by the one or more processors of the computing device, cause the computing device to determine the position information or the angle information for the contour of the object by causing the image capturing device to:
monitor, during a first time period, the position information or the angle information for the contour of the object.

10. An system comprising:
a plurality of projection devices; and
a first computing device comprising:
one or more processors; and
memory operatively coupled to the one or more processors and storing instructions that, when executed, cause the first computing device to:
obtain image data associated with an object;
determine position information or angle information for one or more contours of the object;
based on the position information or angle information, selecting a first set of projection devices, of the plurality of projection devices, to output a three-dimensional representation of the object; and
wherein the first set of projection devices output for display the three-dimensional representation of the object, and wherein the three-dimensional representation is aligned with and projected onto the object.

11. The system of claim 10, wherein the instructions stored in the memory of the computing device, when executed by the one or more processors of the computing device, cause the computing device to:
determine, based on the position information or angle information, the three-dimensional representation of the object.

12. The system of claim 10, wherein the position information or the angle information for the one or more contours of the object is determined by the computing device in real-time.

13. The system of claim 10, wherein the instructions stored in the memory of the computing device, when executed by the one or more processors of the computing device, cause the computing device to:
determine updated position information or updated angle information for one or more contours of the object; and
select a second set of projection devices, of the plurality of projection devices, to output an updated three-dimensional representation of the object.

14. The system of claim 10, wherein the instructions stored in the memory of the computing device, when executed by the one or more processors of the computing device, cause the computing device to:
send, to a second set of projection devices of the plurality of projection devices, a message to not output the three-dimensional representation of the object.

15. The system of claim 10, wherein the three-dimensional representation of the object comprises a footwear design.

16. The system of claim 10, wherein the instructions stored in the memory of the computing device, when executed by the one or more processors of the computing device, cause the computing device to:
determine, based on a stored three-dimensional model, a first set of contours;
determine position information and angle information for each contour in the first set of contours; and
compare, based on respective position information and angle information, the one or more contours of the object with the first set of contours.

17. The system of claim 10, wherein the first set of projection devices outputting for display the three-dimensional representation of the object further comprises:
projecting, onto the object, one or more images indicating surface regions associated with the three-dimensional representation of the object.

18. The system of claim 10, wherein the instructions stored in the memory of the computing device, when executed by the one or more processors of the computing device, cause the computing device to:
use one or more point clouds to generate a two-dimensional representation of a tracking space comprising the object.

19. The system of claim 10, further comprising an image capturing device, wherein the instructions stored in the memory of the computing device, when executed by the one or more processors of the computing device, cause the computing device to:
determine that the object has been monitored by the image capturing device for a threshold period of time; and
use the first set of projection devices to output for display the three-dimensional representation of the object.

20. The system of claim 10, wherein the instructions stored in the memory of the computing device, when executed by the one or more processors of the computing device, cause the computing device to determine the three-dimensional representation of the object by causing:

sending, to a rendering engine, the position information or the angle information for the one or more contours of the object.

* * * * *